(12) United States Patent
Yuan

(10) Patent No.: US 12,440,415 B2
(45) Date of Patent: Oct. 14, 2025

(54) HIP EXOSKELETON

(71) Applicant: Bo Yuan, Chongqing (CN)

(72) Inventor: Bo Yuan, Chongqing (CN)

( * ) Notice: Subject to any disclaimer, the term of this patent is extended or adjusted under 35 U.S.C. 154(b) by 1175 days.

(21) Appl. No.: 17/297,313

(22) PCT Filed: Nov. 27, 2019

(86) PCT No.: PCT/CN2019/121206
§ 371 (c)(1),
(2) Date: Dec. 20, 2021

(87) PCT Pub. No.: WO2020/108517
PCT Pub. Date: Jun. 4, 2020

(65) Prior Publication Data
US 2022/0117825 A1    Apr. 21, 2022

(30) Foreign Application Priority Data

Nov. 28, 2018   (CN) .......................... 201811433860.9
Jul. 19, 2019   (CN) .......................... 201910639370.2

(51) Int. Cl.
*A61H 3/00*    (2006.01)
*B25J 9/00*    (2006.01)
(52) U.S. Cl.
CPC .............. *A61H 3/00* (2013.01); *B25J 9/0006* (2013.01); *A61H 2201/1253* (2013.01); *A61H 2201/1647* (2013.01); *A61H 2201/165* (2013.01); *A61H 2203/0406* (2013.01); *A61H 2205/088* (2013.01)

(58) Field of Classification Search
CPC ...... A61H 2205/088; A61H 3/00; A61H 1/02; A61H 1/0237; A61H 1/0262; A61H 2201/1253; B25J 9/0006
See application file for complete search history.

(56) References Cited

U.S. PATENT DOCUMENTS

| 2011/0028871 | A1  |  2/2011 | Shishido |
| 2015/0335515 | A1* | 11/2015 | Lee ...................... A61H 1/0244 |
| | | | 601/5 |
| 2017/0246740 | A1* |  8/2017 | Barnes ................. B25J 19/0016 |
| 2018/0161188 | A1* |  6/2018 | Zistatsis ................ A61H 1/024 |
| 2019/0262211 | A1* |  8/2019 | Son .................... A63B 23/0405 |

(Continued)

FOREIGN PATENT DOCUMENTS

| CN | 102599998 A | 7/2012 |
| CN | 103142332 A | 6/2013 |
| CN | 103610524 A * | 3/2014 |

(Continued)

OTHER PUBLICATIONS

International Search Report of International Application No. PCT/CN2019/121206.

(Continued)

*Primary Examiner* — Brandy S Lee
*Assistant Examiner* — Mishal Zahra Hussain
(74) *Attorney, Agent, or Firm* — JCIP; Joseph G. Chu

(57) ABSTRACT

An exoskeleton, wherein, comprises a hip mechanism (41). The hip mechanism (41) comprises a left hip (412) and a right hip (413). The left hip (412) and the right hip (413) respectively comprise at least three single-axis mechanisms collaboratively realizing isomorphic motion of the hip mechanism (41) and the hip of the human body.

18 Claims, 25 Drawing Sheets

(56) References Cited

U.S. PATENT DOCUMENTS

2021/0369533 A1* 12/2021 Huang .................. B25J 9/0006

FOREIGN PATENT DOCUMENTS

| CN | 104440884 | A | | 3/2015 | | |
|----|-----------|---|---|--------|---|---|
| CN | 204501525 | U | * | 7/2015 | | |
| CN | 104853712 | A | | 8/2015 | | |
| CN | 105856194 | A | | 8/2016 | | |
| CN | 107773384 | A | * | 3/2018 | ........... | A61H 1/0255 |

OTHER PUBLICATIONS

Written Opinion of International Searching Authority for International Application No. PCT/CN2019/121206.

* cited by examiner

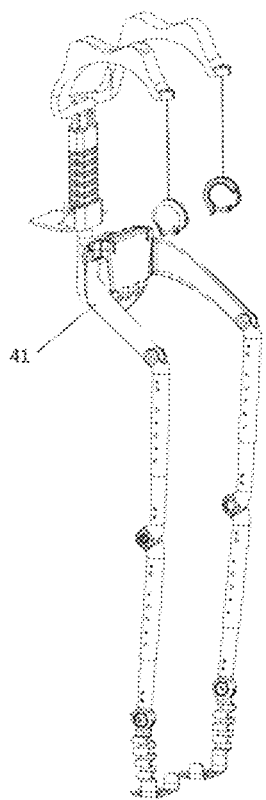
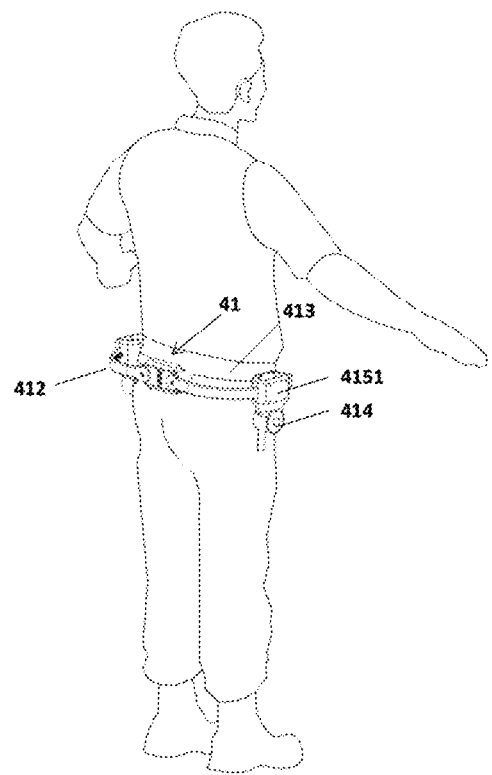
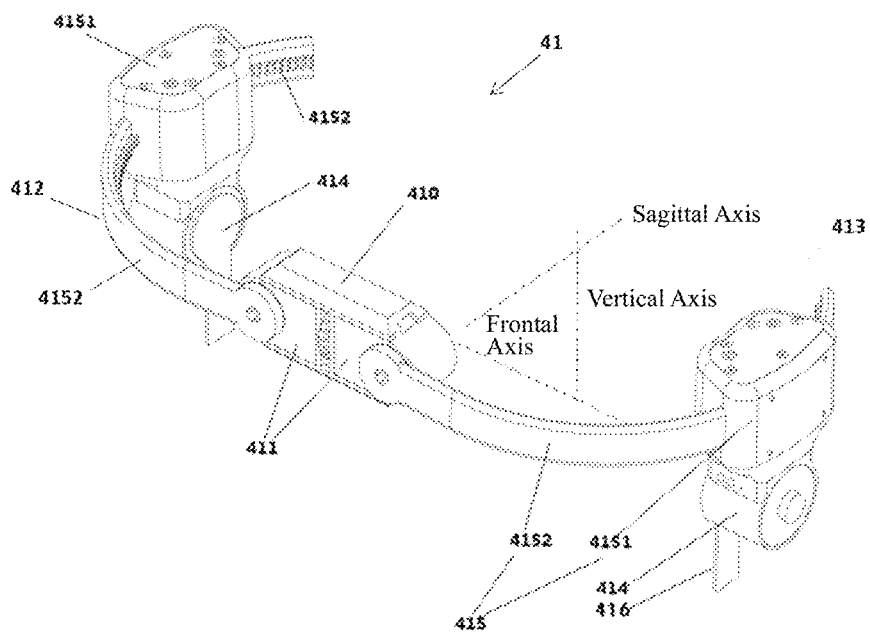
FIG. 1
FIG. 2a
FIG. 2b

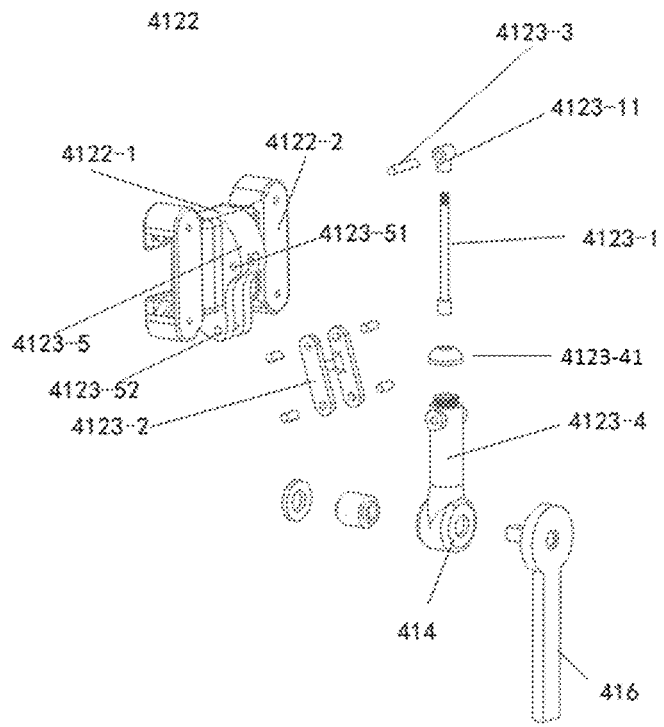
FIG. 11b
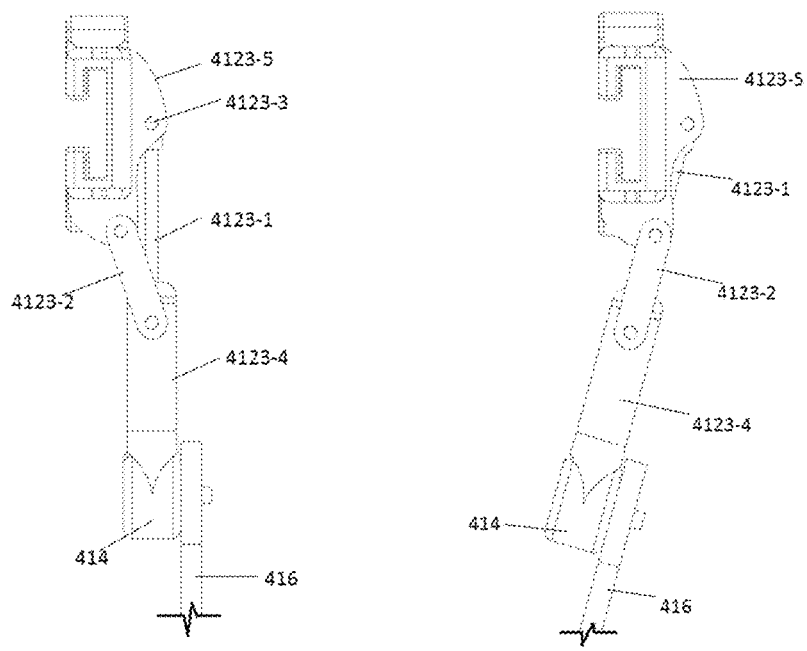
FIG. 11c
FIG. 11d

HIP EXOSKELETON

PRIORITY APPLICATIONS

The present application claims priority from Chinese invention patent application 201811433860.9 "EXOSKELETON" filed on Nov. 29, 2018 and Chinese invention patent application 201910639370.2 "WAIST EXOSKELETON" filed on Jul. 22, 2019, the disclosures of which are incorporated herein in by reference in their entirety for all purposes.

TECHNICAL FIELD

The present invention relates to an exoskeleton load assisting system, and particularly, relates to a wearable exoskeleton capable of realizing isomorphic motion with a wearer's waist.

BACKGROUND

Although today's logistics and transportation, material handling, etc. can be carried out via various means of transport on land, sea, and air, but human-power handling is always an important and irreplaceable handling manner. For example, in the case of geological disaster relief, when the most urgently needed materials are transported, the materials may only be handled by human power because of road damage and other reasons.

The human body is limited by its own physiological structure, and the capability of handling materials for a long time is usually difficult to exceed 20 kg. If a weight-bearing device such as a backpack or a back frame is used, the capability of long-time weight-bearing can be increased to 30 to 50 kg. However, because backpacks and back frames still rely on the shoulder and the back of the human body to bear the weight of a load, and are supported by the skeletal muscles of lower limbs of the human body, the auxiliary weight-bearing capability of backpacks and back frames is limited.

In addition, the human body often needs to handle goods through holding in front of the chest, carrying by the shoulder, and lifting by hands. When handling heavy objects in these ways, the fatigue of handling is generally not caused by excessive exercise, but due to the intense local pressure which shoulders, arms, fingers and other parts are subjected to for a long time, leading to severe uncomfortable feeling at the local limbs, and reaching the fatigue limit of load-handling. For example, if a person carries a 10 kg plastic bag by hands and carries it for less than a few minutes, the fingers to carry the plastic bag will be severely strained and compressed, causing ischemia, and the handling can only be continued after changing hands or taking a rest. In addition, because some items may be not suitable for holding in front of the chest, lifting, taking by hands, etc., and will cause the upper limbs of the human body to apply an extra-large sustained force to lift the items off the ground for handling, which is also an important reason for the inefficiency of handling. For example, when holding a heavy box in front of the human body for handling, the fingers will show obvious ischemia under local pressure. At the same time, since the fingers must be kept in a bending state to prevent the box body from sliding down, forearm muscles continue to apply a force to keep the fingers in a bending state, causing the forearm pain immediately after handling the heavy box body for a while.

An exoskeleton device is a mechanical device that is worn outside the human body. The device can adapt to the limb motion of the human body, assist the human body to bear the weight of a load and/or the human body's own weight, and efficiently transmit the weight of a load and/or the human body's own weight to the ground using its mechanical structure, and even assist the limb motion of the human body. Therefore, it has broad application prospects in the fields of disaster relief, individual weight bearing, firefighting and rescue, outdoor hiking, and logistics and transportation.

However, the existing exoskeleton mechanism is often difficult to fit closely to the wearer's body motion, especially unable to realize isomorphic motion with the wearer's waist, which causes a user to have poor experience and feel constrained or held by an inflexible and rigid mechanical structure. Therefore, how to enhance user experience and enable the exoskeleton device, especially the hip joint exoskeleton, to realize smooth and harmonious isomorphic motion with the hip joint of the human body, is the technical problem to be solved by the present invention.

SUMMARY

The objective of the present invention is to overcome the above defects, and the present invention provides an exoskeleton, wherein, comprising a hip mechanism. The hip mechanism comprises a left hip and a right hip. The left hip and the right hip respectively comprise at least three single-axis mechanisms collaboratively realizing isomorphic motion of the hip mechanism and the hip of the human body.

Further, the at least three single-axis mechanisms comprise a sagittal axis mechanism, a frontal axis mechanism, and a vertical axis mechanism; the sagittal axis mechanism rotates around a sagittal axis of the exoskeleton, and the sagittal axis of the exoskeleton is parallel to that of a thigh of the human body; the frontal axis mechanism rotates around a frontal axis of the exoskeleton, and the frontal axis of the exoskeleton is parallel to that of a thigh of the human body; and the vertical axis mechanism rotates around a vertical axis of the exoskeleton, and the vertical axis of the exoskeleton coincides with or is parallel to that of a thigh of the human body.

Further, the sagittal axis mechanism and the vertical axis mechanism are directly connected and collaboratively move.

Further, the sagittal axis mechanism and the vertical axis mechanism are directly connected by means of quick release.

Further, the frontal axis mechanism is directly connected to and is operable to collaboratively move with the sagittal axis mechanism or the vertical axis mechanism.

Further, the frontal axis mechanism is directly connected to the sagittal axis mechanism or the vertical axis mechanism by means of quick release.

Further, a damping mechanism and/or a rebound mechanism are/is respectively arranged in the at least three single-axis mechanisms.

Further, the damping mechanism comprises a damping force adjusting mechanism; and the rebound mechanism comprises a rebound force adjusting mechanism.

Further, the hip mechanism also comprises a hip base; the sagittal axis mechanism comprises a sagittal axis mounting base; the frontal axis mechanism comprises a frontal axis mounting base; and the vertical axis mechanism comprises at least one movement rail; wherein, the frontal axis mounting base is arranged on the at least one movement rail and can move on the at least one movement rail along the length direction of the at least one movement rail; and one side of each sagittal axis mounting base is arranged in the hip base, and the other side is connected to the at least one movement rail.

Further, the at least one movement rail comprises a slide rail mechanism and a pulley mechanism which are slidably connected; wherein one end of the slide rail mechanism is connected to the sagittal axis mounting base, the frontal axis mounting base is fixed on the pulley mechanism, and the pulley mechanism can slide on the slide rail mechanism along the length direction of the slide rail mechanism so that the frontal axis mounting base is driven by the pulley mechanism to rotate around the vertical axis mechanism around the vertical axis of the exoskeleton on the slide rail mechanism.

Further, a hip base adjusting device is arranged in the hip base to adjust the length of the hip base.

Further, the sagittal axis mounting base and the slide rail mechanism are connected by means of quick release.

Further, a damping mechanism and/or a rebound mechanism are/is arranged in the sagittal axis mounting base.

Further, a rotary damping mechanism and/or a two-way rebound mechanism are/is arranged in the pulley mechanism and/or the frontal axis mounting base.

Further, the movement rail comprises a telescopic rod mechanism, one end of the telescopic rod mechanism is installed on the sagittal axis mounting base, and the other end is fixedly connected to the frontal axis mounting base; and the telescopic rod drives the frontal axis mounting base to rotate around the vertical axis of the exoskeleton during contraction or extension.

Further, wherein, the telescopic rod mechanism comprises an inner rail, an inner ball retainer, a middle rail, an outer ball retainer, an outer rail, and a flexible porous cover which are sleeved in sequence, wherein, the inner ball retainer is uniformly provided with a plurality of inner steel balls so that the inner steel balls can slide along the inner rail, and the middle rail can slide along the inner ball retainer; and the outer ball retainer is uniformly provided with a plurality of outer steel balls so that the outer steel balls can slide along the middle rail, and the outer rail can slide along the outer ball retainer.

Further, the hip mechanism comprises a hip base, the left hip and the right hip of the hip mechanism are respectively hinged on the left and right sides of the hip base, and the left hip and the right hip can rotate in a horizontal plane; the vertical axis mechanism comprises a movement rail composed of a plurality of slide rails connected end to end in sequence, and a variable-curvature pulley mechanism; the head end of the plurality of slide rails is rotatably connected to the hip base, and the tail end is connected to the plurality of slide rails on the other side; and the variable-curvature pulley mechanism is installed on the plurality of slide rails and slides on the movement rail; one end of the sagittal axis mechanism is installed on the variable-curvature pulley mechanism, and the other end is connected to the frontal axis mounting base of the frontal axis mechanism; the sagittal axis mechanism takes the form of a guide rod position-changing mechanism to rotate around the sagittal axis of the exoskeleton.

Further, the variable-curvature pulley mechanism comprises a variable-curvature main pulley and variable-curvature side pulleys respectively hinged on both sides of the variable-curvature main pulley, and the variable-curvature main pulley and the variable-curvature side pulleys are installed on the movement rail in the form of being capable of sliding relative to the plurality of slide rails.

Further, a stopper or a limiting groove for limiting the rotation angle of the variable-curvature side pulley relative to the variable-curvature main pulley is arranged at the hinge point of the variable-curvature main pulley and the variable-curvature side pulley.

Further, the guide rod position-changing mechanism comprises a guide rod, a rocker, a piston cylinder, and a base fixed on the variable-curvature main pulley, wherein one end of the guide rod is hinged with the middle part of the base, and the other end is fixedly connected to a piston head in the piston cylinder; one end of the rocker is hinged with the bottom of the base, and the other end is hinged with the cylinder head of the piston cylinder; and the bottom of the piston cylinder is fixedly connected to the frontal axis mounting base.

Further, the hip mechanism also comprises a flexible waist belt, and the plurality of slide rails are fitted on the outer side of the flexible waist belt along the length direction of the flexible waist belt.

Further, the hip mechanism also comprises a hip width adjusting member arranged on the hip base, and the hip width adjusting member is located between the left hip and the right hip and drives the left hip and the right hip to horizontally move towards or away from on the hip base.

The present invention provides a waist exoskeleton device, wherein, comprising a waist slide rail, a waist pulley, and a waist elastic mechanism; the waist pulley can slide along the waist slide rail; and the waist elastic mechanism is placed on the waist slide rail and connected to the waist pulley, and provides elastic energy storage during the sliding process of the waist pulley along the waist slide rail.

Further, the waist slide rail is composed of a plurality of waist slide rail pieces, wherein the adjacent waist slide pieces are foldable against each other.

Further, the waist elastic mechanism is a torsion spring, a tension spring, a compression spring or a pneumatic pusher.

Further, the waist slide rail comprises a left waist slide rail and a right waist slide rail; the waist pulley comprises a left waist pulley and a right waist pulley; the waist elastic mechanism comprises a left waist elastic mechanism and a right waist elastic mechanism; the left waist elastic mechanism is placed on the left waist slide rail and connected to the left waist pulley, and provides elastic energy storage during the sliding process of the left waist pulley along the left waist slide rail; and the right waist elastic mechanism is placed on the right waist slide rail and connected to the right waist pulley, and provides elastic energy storage during the sliding process of the right waist pulley along the right waist slide rail.

Further, the waist pulley is connected to a hip joint sagittal axis mechanism, and the hip joint sagittal axis mechanism is connected to a lower limb exoskeleton device and drives the lower limb exoskeleton device to turn towards the left and right sides of the human body.

Further, a lateral rotation elastic energy storage device is arranged in the hip joint sagittal axis mechanism.

Further, the lateral rotation elastic energy storage device is a torsion spring, a tension spring, a compression spring or a pneumatic pusher.

Further, the waist pulley is connected to a hip joint frontal axis mechanism, and the hip joint frontal axis mechanism is connected to the lower limb exoskeleton device and drives the lower limb exoskeleton device to turn towards the front and back of the human body.

Further, a forward and backward rotation elastic energy storage device is arranged in the hip joint frontal axis mechanism.

Further, the forward and backward rotation elastic energy storage device is a torsion spring, a tension spring, a compression spring or a pneumatic pusher.

It must be emphasized that in actual use, the three single-axis mechanisms adopted by the present invention collaboratively work. For example, when an exoskeleton wearer lifts a leg upwards while abducing the leg, the sagittal axis mechanism, the frontal axis mechanism, and the vertical axis mechanism operate simultaneously to achieve isomorphic motion with the wearer.

Compared with the Prior Art, the Present Invention at Least has the Following Beneficial Technical Advantages Generally, the existing exoskeleton mechanism can only realize collinearity of one single axis, such as collinearity of frontal axis, collinearity of sagittal axis, or collinearity of vertical axis of waist/thigh of human body, but cannot realize simultaneous collinearity of the three axes of the exoskeleton respectively with the three corresponding axes of the human body, i.e., it is difficult to completely realize isomorphic motion of the hip joint of the exoskeleton and the hip joint of the human body. The hip mechanism of the exoskeleton of the present invention can closely fit the human body motion and the motion trajectory of the exoskeleton is roughly the same as the hip motion of the wearer on the premise of not invading the wearer's body, i.e., the isomorphic motion of the hip joint is better realized.

Meanwhile, the exoskeleton mechanism has a higher degree of fitting with the human body in motion so that the exoskeleton mechanism can transmit the weight of a load to the ground via the exoskeleton mechanism more efficiently when carrying heavy objects, improving the weight-bearing effect of the exoskeleton to a certain extent.

In addition, by arrangement of at least three single-axis mechanisms, different damping forces and resilience forces can be set at different axis mechanisms according to the actual application scenario and the wearer's physical condition so that the exoskeleton device can be more individualized and meet different requirements more flexibly in actual use. It is important to individually and adjustably set the damping force and the resilience force for the exoskeleton wearer, which prevents the wearer from moving too fast or too substantially, makes the wearer move controllably, stably and smoothly, and avoids accidents during rapid or large rotation.

In addition, connecting the sagittal axis mechanism, the frontal axis mechanism, and the vertical axis mechanism by means of quick release, enables the exoskeleton mechanism disassembled flexibly and more convenient for the wearer to put on and take off.

DESCRIPTION OF DRAWINGS

FIG. 1 is a schematic diagram showing the structure of an embodiment of an exoskeleton in the prior art;

FIG. 2a is a schematic diagram showing the structure of an embodiment of a hip mechanism of an exoskeleton of the present invention;

FIG. 2b is a schematic diagram showing that three axes of a hip mechanism in FIG. 2a respectively correspond to the vertical axis, the frontal axis, and the sagittal axis of a wearer;

FIG. 2c is a schematic diagram showing that a sagittal axis and a sagittal axis mounting base of a hip mechanism are matched and a frontal axis and a frontal axis mounting base are matched in FIG. 2a;

FIG. 2f is a schematic diagram showing a hip mechanism in FIG. 2a;

FIG. 4b, FIG. 4c, and FIG. 4d are exploded views of a frontal axis mounting base in FIG. 4a;

FIG. 4e is an assembly diagram showing a two-way rebound mechanism in a frontal axis mounting base in FIG. 4a;

FIG. 7b is a schematic diagram showing isomorphic motion of thigh abduction of a second embodiment of a hip mechanism in FIG. 7a;

FIG. 7c is a schematic diagram showing isomorphic motion of thigh external rotation of a second embodiment of a hip mechanism in FIG. 7a;

FIG. 7d is a schematic diagram showing isomorphic motion of thigh adduction of a second embodiment of a hip mechanism in FIG. 7a;

FIG. 7e is a schematic diagram showing isomorphic motion of thigh flexion of a second embodiment of a hip mechanism in FIG. 7a;

FIG. 7f is a schematic diagram showing isomorphic motion of thigh rear extension of a second embodiment of a hip mechanism in FIG. 7a;

FIG. 8a is an exploded view of a hip mechanism in FIG. 7a;

FIG. 8b is a schematic diagram (top view) of a hip mechanism in FIG. 7a;

FIG. 8c is a schematic diagram (top view, anatomy diagram of a right hip mechanism) of a hip mechanism in FIG. 7a;

FIG. 8d is a schematic diagram (anatomy diagram of a right hip mechanism) of a hip mechanism in FIG. 7a;

FIG. 9c is an exploded view of a hip mechanism in FIG. 9a;

FIG. 9e is a top view showing the structure in FIG. 9a;

FIG. 9f is a schematic diagram showing isomorphic motion of thigh abduction of a third embodiment of a hip mechanism in FIG. 9a;

FIG. 9g is a schematic diagram showing isomorphic motion of thigh adduction of a third embodiment of a hip mechanism in FIG. 9a;

FIG. 9h is a schematic diagram showing isomorphic motion of left leg rear extension and right leg flexion and abduction of a third embodiment of a hip mechanism in FIG. 9a;

FIG. 11b is an exploded view of a guide rod position-changing mechanism in FIG. 11a;

FIG. 11c and FIG. 11d are respectively schematic diagrams showing change of the distance between the top end of a guide rod and the cylinder head of a piston cylinder during abduction and adduction of a guide rod position-changing mechanism in FIG. 11a;

Figure 2C:
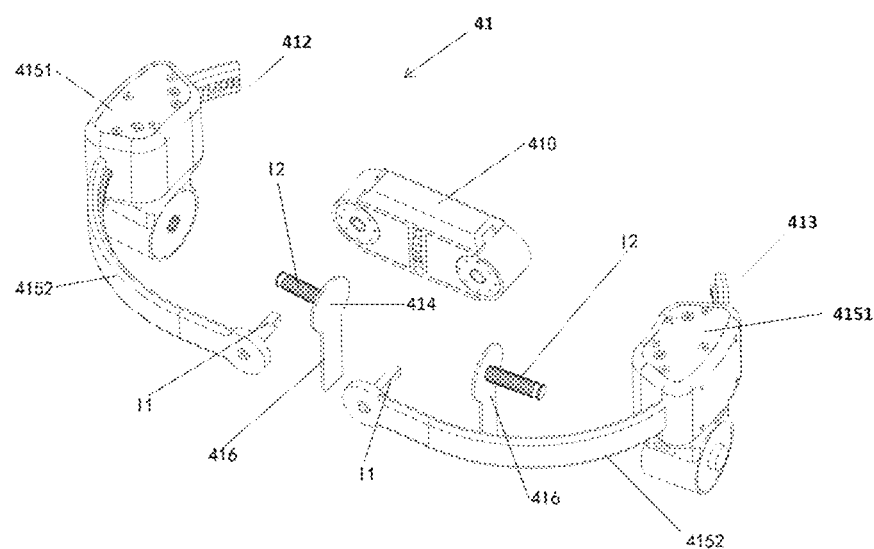

REFERENCE SIGNS IN THE ABOVE DRAWINGS ARE AS FOLLOWS hip mechanism 41; hip base 410; sagittal axis mounting base 411; left hip 412 and right hip 413; frontal axis mounting base 414; movement rail 415; thigh connecting rod 416; hip width adjusting member 417; shifting disk 417-1; lead screw 417-2; pulley mechanism 4151; slide rail mechanism 4152; left slide block 4101 and right slide block 4102; rail 4103; vertical latch 4104; sagittal axis I1; frontal axis I2;

tenon quick-release connector 544; first ball 545; quick-release button 531; quick-release button mounting hole 552; first ball locking groove 532; tenon quick-release hole 533; spline quick-release head 541; first ball groove 534; second ball locking groove 546; spline quick-release hole 537; second ball groove 538; damping mechanism 55; damping box inner cover 550; damping box outer cover 551; damping fluid diversion groove 553; damping fluid fluctuation block 554; damping fluid injection hole 555; damping fluid overflow groove 556; fixed wedge mouth 557;

adjusting knob 558; adjustable wedge surface 559; damper shifting disk 5510; disk body 5511; damping fluid shifting block 5512; rebound mechanism 56; torsion spring 560; housing 530 of quick-release head; outer ear 5601; torsion spring outer ear groove 5301; torsion spring inner ear hole 5302; quick-release shaft sleeve 539; inner ear 5602; rebound shaft sleeve 565; two-way rebound mounting base 561; clockwise rebound turbine 562a and anticlockwise rebound turbine 562b; clockwise rebound worm 564a and anticlockwise rebound worm 564b; clockwise rebound torsion spring 563a and anticlockwise rebound torsion spring 563b; outer ear 5601; outer ear jack 5621; inner ear 5602; left inner ear chute 5651a and right inner ear chute 5651b; clockwise rebound stopper 5611a and anticlockwise rebound stopper 5611b; clockwise rebound shaft sleeve stopper 5653 and anticlockwise rebound shaft sleeve stopper 5654;

pulley mechanism 4151; slide rail mechanism 4152; pulley mounting seat 4151-1; top cover 4151-11; rotary clamping slot 4151-12; slide rail meshing roller 4151-10; slide rail meshing gear 4151-3; slotted rotating shaft 4151-31; roller pin 4151-101; pin hole 4151-13; slide rail meshing gear mounting groove 4151-14; damping box mounting groove 4151-15; slide rail through-hole 4151-2; rotary damping mechanism 4151-4; rotary damping box 4151-41 and damping fluid shifting piece 4151-42; two-way rebound mechanism 4151-5; external rotation mainspring fixing disk 4151-51, internal rotation mainspring fixing disk 4151-52, external rotation resilience adjusting gear 4151-53, internal rotation resilience adjusting gear 4151-54, internal rotation resilience adjusting button 4151-55, external rotation resilience adjusting button 4151-56, external rotation rebound mainspring 4151-57 and internal rotation rebound mainspring 4151-5; external rotation mainspring fixing disk gear 4151-511; external rotation mainspring locating slot 4151-512; internal rotation mainspring fixing disk gear 4151-521; internal rotation mainspring locating slot 4151-522; external rotation rebound mainspring 4151-57 and internal rotation rebound mainspring 4151-58; outer ear 4151-571 and 4151-581; inner ear 4151-572 and 4151-582 of rebound mainspring; rotating shaft 4151-50 of adjusting gear; resilience adjusting mechanism mounting chamber 4151-16; knob mounting base 4151-551; knob body 4151-552; sleeve 4151-553; rotary clamping pin 4151-554; internal rotation resilience adjusting button reset spring 4151-59 and external rotation resilience adjusting button reset spring 4151-510;

movement rail 415; inner rail 4153, inner ball retainer 4154, middle rail 4155, outer ball retainer 4156, outer rail 4157 and flexible porous outer cover 4158;

a plurality of slide rails 4121; variable-curvature pulley mechanism 4122; guide rod position-changing mechanism 4123; snap-fit male connector M and snap-fit female connector F; variable-curvature main pulley 4122-1; side pulley 4122-2; horizontal roller 4122-3; vertical roller 4122-4; side wall 4122-11; side pulley hinge seat 4122-12; guide rod 4123-1, rocker 4123-2, sagittal axis 4123-3, piston cylinder 4123-4 and base 4123-5; main pulley side wall 4122-2; guide rod pin hole 4123-51 and rocker pin hole 4123-52; piston head 4123-41; guide rod sleeve 4123-11; flexible waist belt 415-1; fixed bump 4121-1; waist bandage 415-11; back sponge 415-12;

waist exoskeleton device 100; waist slide rail 200; waist pulley 202; waist elastic mechanism 210; waist-circling groove 204; groove 209; waist pulley connecting block 212; screw/bolt 216; waist elastic mechanism connecting member 214; baffle 218; back support device 102; lower limb exoskeleton device 105; thigh elastic energy storage device 104; knee joint exoskeleton device 106; shank exoskeleton supporting member 108; foot exoskeleton device 110; back-carrying platform 103; contact part 207; space 208; waist slide rail piece 211; hip joint rotary connecting part 300; hip joint sagittal axis mechanism 304; hip joint frontal axis mechanism 310; lateral rotation elastic energy storage device 302; forward and backward rotation elastic energy storage device 306; lateral rotation shaft 307; lateral rotation shaft rail 303; right male part 308 of hip joint frontal axis mechanism; right female part 309 of hip joint frontal axis mechanism; lower limb connecting part 311; first connector 312; and second connector 313.

DETAILED DESCRIPTION

To make the objective, the technical solutions and advantages of the embodiments of the present invention clearer, the present invention will be further described below in combination with drawings and embodiments. It should be understood that specific embodiments described herein are only used to explain the present invention, not to limit the present invention. In all of the drawings, similar components or parts are generally identified by similar marks of the drawings. In the drawings, the components or parts are not necessarily drawn to actual scale.

It should be noted that all directional indications (such as up, down, left, right, front, back . . . ) in embodiments of the present invention are only used to explain the relative position, movement, etc., among the components in a particular posture (as shown in the drawings). If the particular posture changes, the directional indication changes accordingly.

In addition, in the present invention, descriptions involving terms such as "first" and "second" are used for descriptive purposes only and are not to be construed as indicating or implying a relative importance or implicitly specifying the number of technical features indicated. Thus, the features defining "first" and "second" may include at least one of the features, either explicitly or implicitly. In the description of the present invention, the meaning of "plurality" means at least two, such as two, three, etc., unless expressly and specifically defined otherwise.

In addition, various embodiments of the present invention can be combined to derive other technical solutions, alleviate more technical problems, and achieve more technical effects. Therefore, the description of various embodiments herein can be mutually confirmed, explained, illustrated, combined, integrated and merged. However, the description of various embodiments herein may involve some identical or similar words. If the identical or similar words conflict or contradict in understanding and meaning, then the understanding and meaning of the words in the description of the respective embodiments shall prevail. For example, the words such as "base", "connecting member", "movement rail", "slide rail", and "pulley" may appear in different embodiments. Then, the "base" in embodiment 1 shall be understood according to the context of embodiment 1, and the "base" in embodiment 2 shall be understood according to the context of embodiment 2.

In addition, suffixes such as "mechanism", "module", "component" or "unit" used to indicate elements is only for the purpose of facilitating the description of the present invention and has no specific meaning. Therefore, "mechanism", "module", "component" or "unit" can be used interchangeably.

Definition of Term

"Isomorphic motion": the isomorphic motion herein means that the motion law of the waist/hip mechanism of the exoskeleton is as same as possible to the motion of the hip joint of the human body in order to fit the human body motion more closely, that is, the hip joint of the human body, as a spatial spherical joint, can rotate independently around the sagittal axis, the frontal axis, and the vertical axis of the human body in three degrees of freedom, and the waist/hip of the exoskeleton also can rotate independently around the sagittal axis, the frontal axis, and the vertical axis of the human body in three degrees of freedom.

To closely fit the human body motion, the motion trajectory of the exoskeleton should be the same as that of the human body as much as possible. However, since the mechanical structure of the exoskeleton is worn outside the human body and cannot invade the internal structure of the human body, the hip mechanism of the existing exoskeleton usually can only realize collinearity ("collinearity" means two or more axes overlap or are in parallel) of one single axis, such as collinearity of frontal axis, or collinearity of sagittal axis, or collinearity of vertical axis of thigh of human body. But it cannot realize simultaneous collinearity of the three axes of the exoskeleton respectively with the three corresponding axes of the human body, i.e., it is difficult to completely realize isomorphic motion with the hip joint of the human body (for example, a mechanical exoskeleton shown in FIG. 1). Based on this, the embodiments of the present invention provide an exoskeleton which is used for performing isomorphic motion with a wearer's waist on the premise of not invading the wearer's body. Specifically, the exoskeleton comprises a hip mechanism, and the hip mechanism 41 realizes isomorphic motion of the hip joint of the exoskeleton and the hip joint of the human body by collaborative operation of three single-axis mechanisms.

"Sagittal axis mechanism": the sagittal axis mechanism herein refers to an exoskeleton mechanism capable of realizing isomorphic motion with the sagittal axis of the hip joint or thigh of the human body (i.e., adduction and abduction of the hip joint or thigh of the human body). The sagittal axis mechanism can be arranged on the back of the human body (for example, in the position of the sagittal axis mounting base 411 in embodiment 1 and the sagittal axis mounting base 411 in embodiment 2), and on the outer side of a thigh of the human body (for example, in embodiment 3, the sagittal axis mechanism adopts the structure of the guide rod position-changing mechanism 4123; and in embodiment 6, the sagittal axis mechanism adopts the hip joint sagittal axis mechanism 304).

"Frontal axis mechanism": the frontal axis mechanism herein refers to an exoskeleton mechanism capable of realizing isomorphic motion with the frontal axis of the hip joint or thigh of the human body (i.e., flexion and extension of the hip joint or thigh of the human body). The frontal axis mechanism can be arranged on the outer side of a thigh of the human body and directly connected to the movement rail that the vertical axis mechanism comprises (for example, 414 in embodiment 1 and embodiment 2), and also can be arranged on the lower end of the sagittal axis mechanism and indirectly connected to the movement rail that the vertical axis mechanism comprises via the sagittal axis mechanism (for example, 414 in embodiment 3 and 310 in embodiment 6).

"Vertical axis mechanism": the vertical axis mechanism herein refers to an exoskeleton mechanism capable of realizing isomorphic motion with the vertical axis of the hip joint or thigh of the human body (i.e., rotation of the hip joint or thigh of the human body, including internal rotation and external rotation). In some embodiments of the present invention, the "vertical axis mechanism" comprises at least one movement rail/slide rail.

Figure 2D:
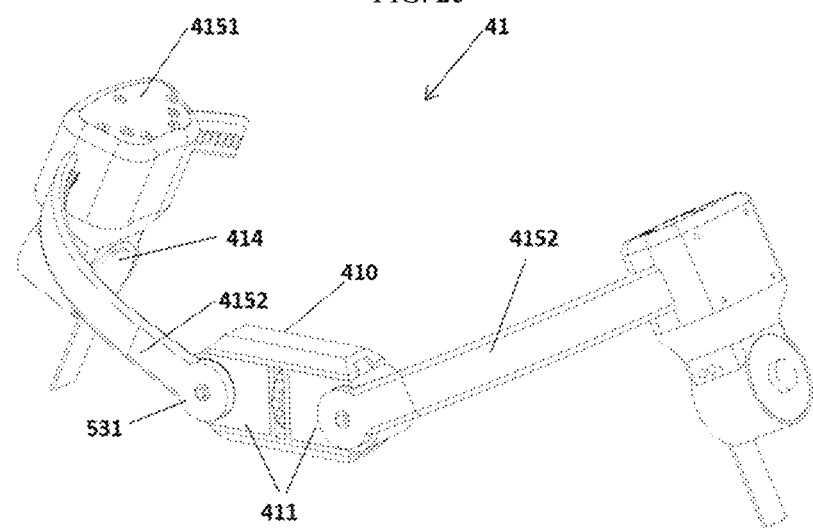
FIG. 2d and FIG. 2e are respectively schematic diagrams showing abduction and adduction of a left hip and a right hip in FIG. 2b.
Figure 2E:
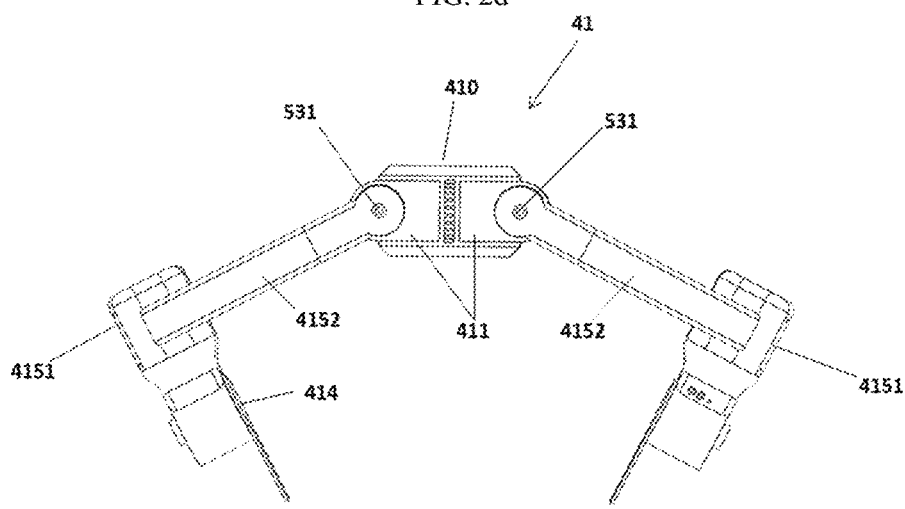
Figure 2F:
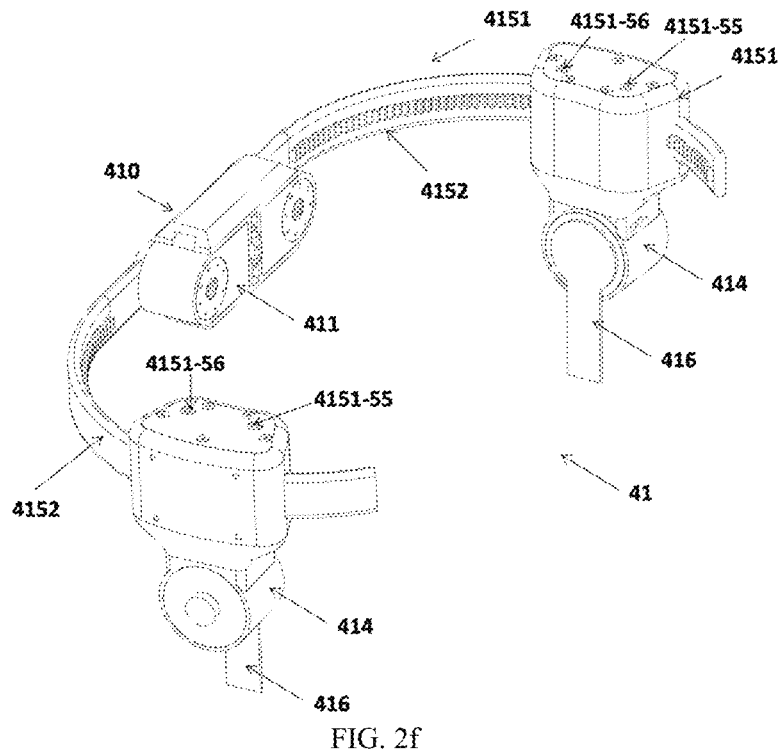
Figure 2G:
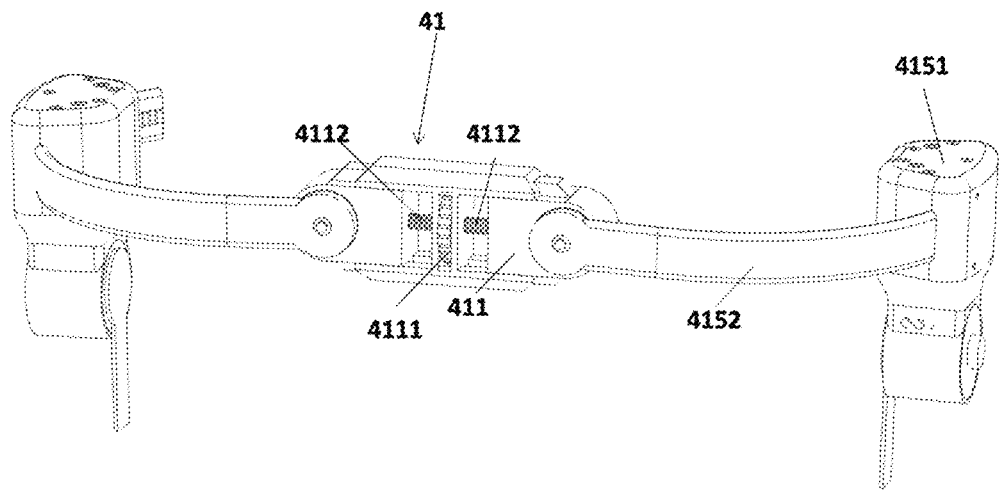
FIG. 2g is a schematic diagram showing a hip width adjusting member on a hip base.

Embodiment 1 a Slide-Rail Type Three Single-Axis Quick-Release Waist Device with Rebound Damping With reference to FIG. 2a-FIG. 2e, in this embodiment, the hip mechanism 41 comprises a hip base 410 and sagittal axis mounting bases 411 respectively arranged on the left and right sides of the hip base 410. The hip mechanism 41 also comprises a left hip 412 and a right hip 413. The left hip 412 and the right hip 413 are respectively installed on the sagittal axis mounting bases 411 on the left and right sides via the corresponding sagittal axis, and the sagittal axes of the left hip 412 and the right hip 413 are respectively collinear with the sagittal axes of the left and right thighs of the human body (i.e., sagittal axes overlap or are in parallel) so that the thigh of the lower limbs of the exoskeleton can realize abduction (as shown in FIG. 2d) or adduction (as shown in FIG. 2e).

With reference to FIG. 2b and FIG. 2c, in a specific embodiment, both the left hip 412 and the right hip 413 comprise a frontal axis mounting base 414 and a movement rail 415 providing a movement track for the frontal axis mounting bases 414 (specifically, the shape of the movement rail is arc, or other shapes that can fit the hip/waist shape of the human body), wherein the central axis of the movement rails 415 on the left and right sides respectively coincide with the vertical axes of the left hip and the right hip of the human body (i.e., the movement rails of the left hip 412 and the right hip 413 of the hip mechanism 41 respectively coincide with the vertical axes of the left thigh and the right thigh of the human body). Moreover, the frontal axis mounting base 414 is arranged on the movement rail 415 and can move on the movement rail 415 along the length direction of the movement rail 415 so that the frontal axis mounting base 414 can rotate around the vertical axis of the thigh of the human body so as to realize internal rotation or external rotation of the thigh of the lower limbs. Specifically, the movement rail 415 comprises a pulley mechanism 4151 and a slide rail mechanism 4152 which are slidably connected, wherein the central axis of the slide rail mechanism 4152 coincides with the vertical axis of the thigh of the human body (for example, the central axis of the slide rail mechanism 4152 of the left hip 412 coincides with the vertical axis of the left thigh of the human body), one end of the slide rail mechanism 4152 is installed on the sagittal axis mounting base 411 via a sagittal axis I1, and the other end is a free end. Moreover, the frontal axis mounting base 414 is fixed on the pulley mechanism 4151, and the pulley mechanism 4151 can slide on the slide rail mechanism 4152 along the length direction of the slide rail mechanism 4152, so that the frontal axis mounting base 414 is driven by the pulley mechanism 4151 to rotate around the central axis of the slide rail mechanism 4152, i.e., the vertical axis of the thigh of the human body, so as to realize internal rotation or external rotation of the thigh of the lower limbs in the exoskeleton.

With reference to FIG. 2b and FIG. 2c, in this embodiment, the sagittal axis mounting base 411 and the left hip 412/the right hip 413 are connected by means of a quick-release rotating shaft (i.e., the sagittal axis mounting base 411 and the rotating shaft of the left hip 412/the right hip 413, that is, the sagittal axis, form a quick-release rotating shaft connecting mechanism) so that the sagittal axis I1 is locked in the sagittal axis mounting base 411 and can rotate relative to the sagittal axis mounting base 411. When disassembling the exoskeleton quickly is needed, the sagittal shaft is unlocked from the sagittal axis mounting base 411 by directly pressing or rotating the corresponding auxiliary component so as to disassemble it from the sagittal axis mounting base 411 quickly.

Figure 3A:
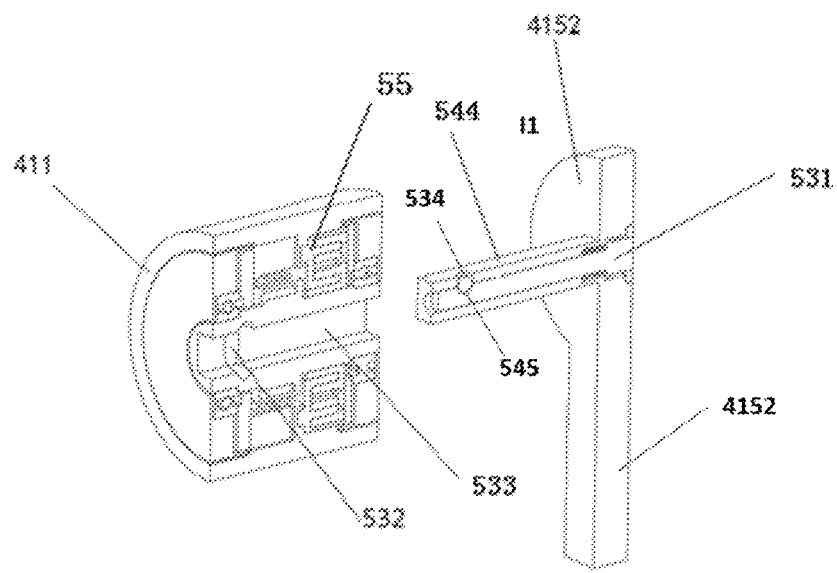
FIG. 3a is a sectional view showing a quick-release rotating shaft connecting mechanism, comprising a sagittal axis and a sagittal axis mounting base in FIG. 2b.

With reference to FIG. 3a, in a specific embodiment, the sagittal rotating shaft I1 on one end of the left hip 412/the right hip 413 adopts a tenon quick-release connector 544. The tenon quick-release connector 544 is provided with a quick-release button 531 inside, and the end of the tenon quick-release connector 544 is provided with a first ball 545. Moreover, the end of the quick-release button 531 is also provided with a first ball groove 534. And when the quick-release button 531 is pressed, the first ball groove 534 moves to below the first ball 545 so that the first ball 545 falls into the first ball groove 534 to enable the tenon quick-release connector 544 to insert into or slide out of a tenon quick-release hole 533 arranged in the frontal axis mounting base 414. And after the tenon quick-release connector 544 is inserted, stable connection can be realized without pressing the quick-release button 531 again. Further, the end of the tenon quick-release hole 533 is provided with a first ball locking groove 532. Thus, when the tenon quick-release connector 544, that is, the sagittal axis I1, is inserted into the tenon quick-release hole 533 and the first ball 545 moves to the position of the first ball locking groove 532, the tenon quick-release connector 544 forces the first ball 545 into the first ball locking groove 532 due to the action of the reset spring of the quick-release button 531 so as to make the left hip 412/the right hip 413 and the sagittal axis mounting base 411 locked upwards on the single-degree-of-freedom rotating shaft. When quick release is needed, the quick-release button 531 is pressed so that the first ball 545 falls into the tenon quick-release connector 544 or the first ball groove 534 on the quick-release button, and then the tenon quick-release connector 544, i.e., the sagittal axis I1, is pulled out. At this time, the tenon quick-release connector 544 can be directly pulled out without pressing the button.

Figure 4A:
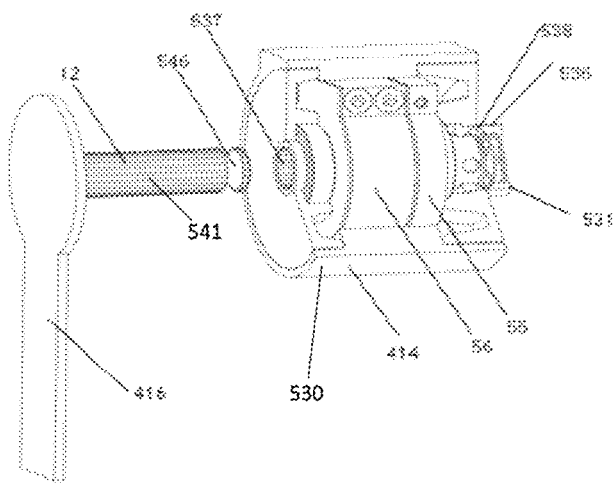
FIG. 4a is a sectional view of a quick-release rotating shaft connecting mechanism comprising a frontal axis and a frontal axis mounting base of a hip mechanism in FIG. 2b.
Figure 4B:
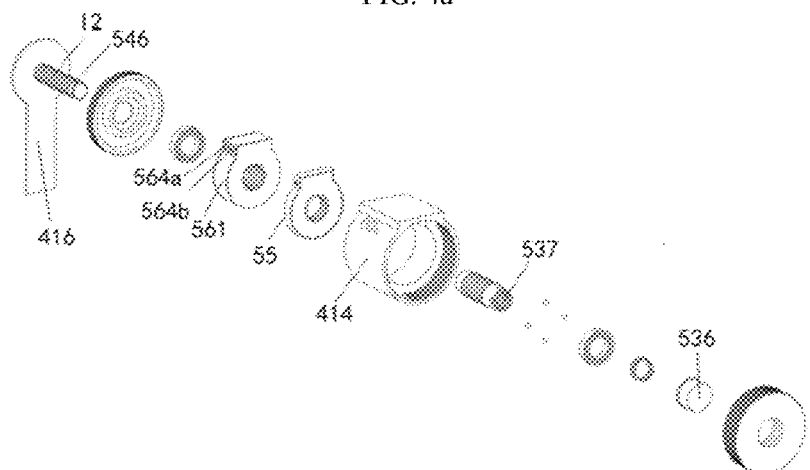
Figure 4C:
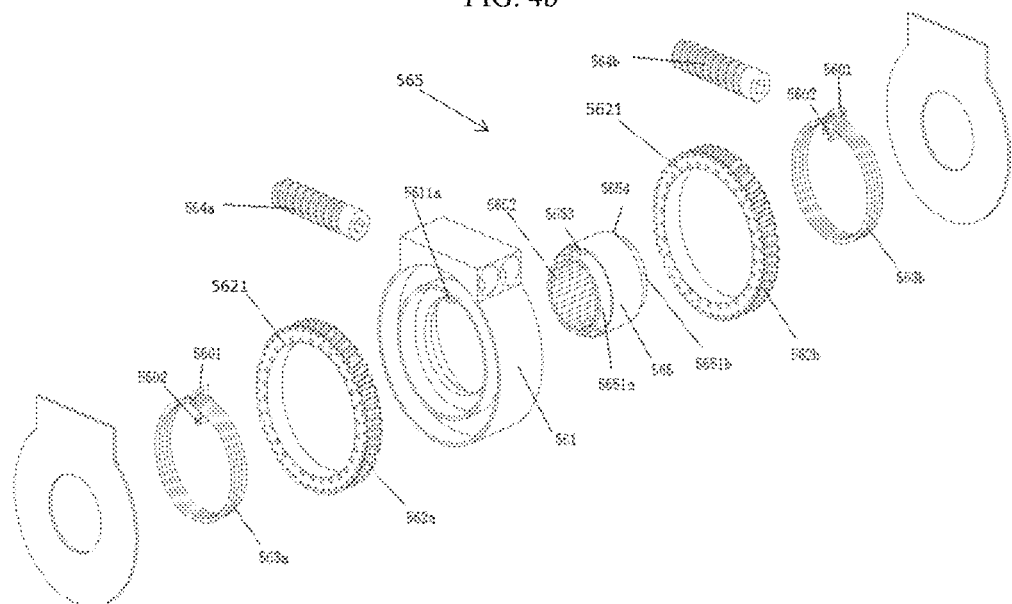
Figure 4D:
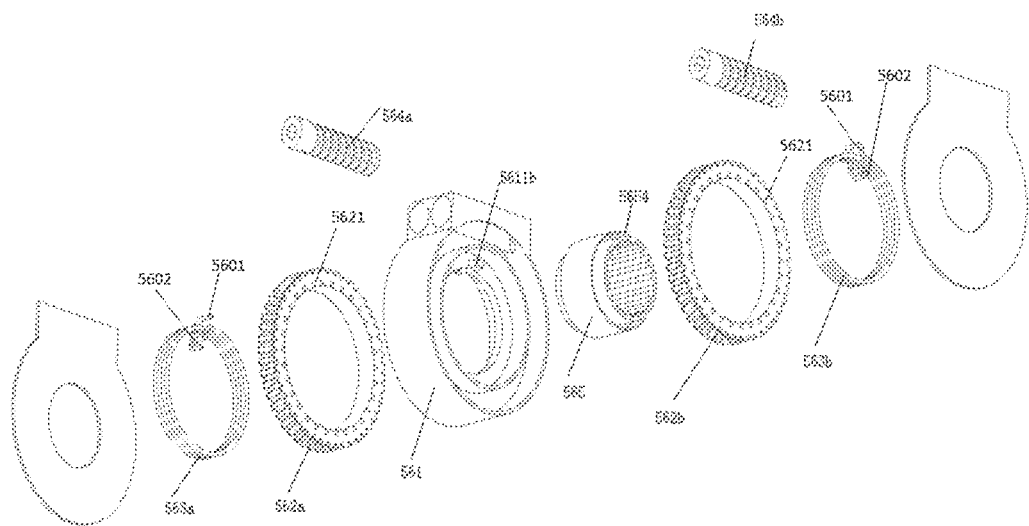
Figure 4E:
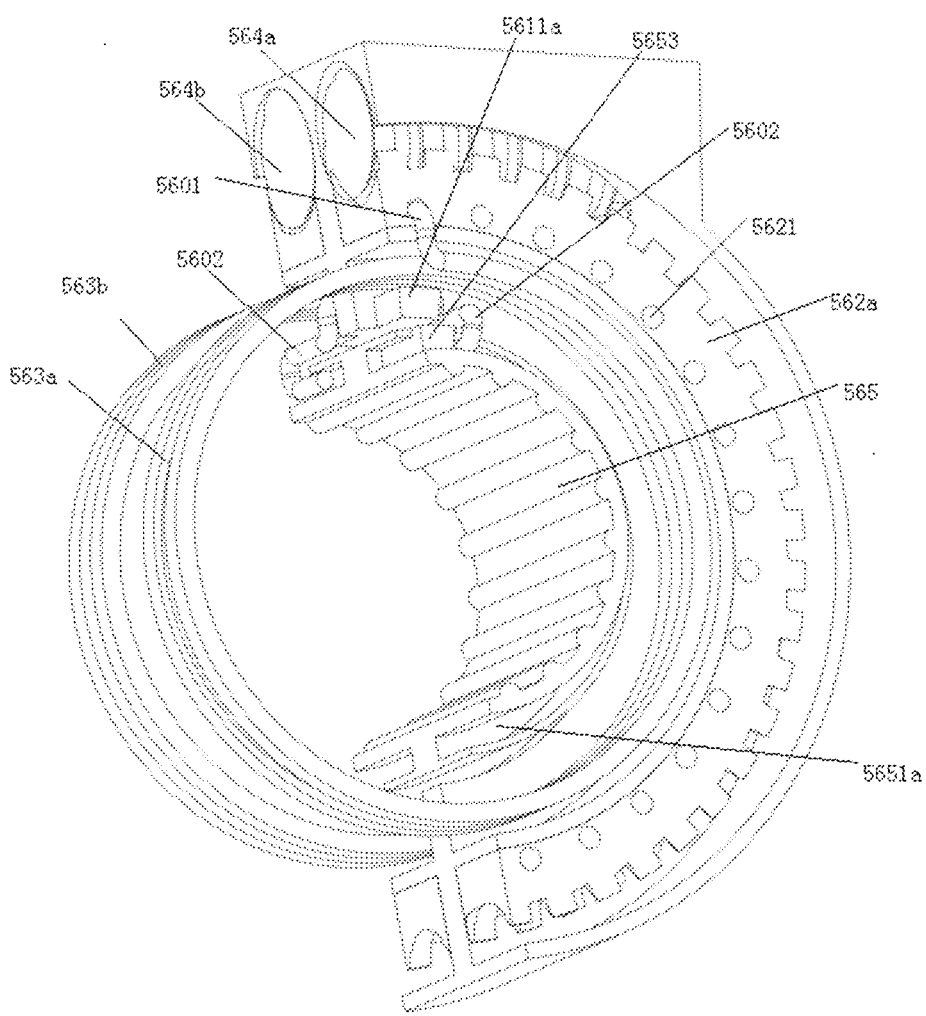

Similarly, with reference to FIG. 2b, FIG. 2c and FIG. 4a, in a specific embodiment, the frontal axis mounting base 414 and a thigh connecting rod 416 also can be connected by means of a quick-release rotating shaft (i.e., the rotating shaft of the thigh connecting rod, that is, the frontal axis 12, and the frontal shaft mounting base to form a quick-release rotating shaft connecting mechanism) so that one end of the thigh connecting rod 416 is rotatably connected to the frontal axis mounting base 414 via the frontal axis 12. Specifically, a spline quick-release hole 537 and a quick-release button 531 are arranged in the frontal axis mounting base 414, a reset spring is arranged in the quick-release button 531, the inner wall is provided with a second ball groove 538, the frontal axis 12 on one end of the thigh connecting rod 416 adopts a spline quick-release head 541, and the end is provided with a second ball locking groove 546. When the spline quick-release head 541 is inserted into the spline quick-release hole 537, meanwhile, the quick-release button 531 is pressed to compress the reset spring so that the second ball groove 538 is exposed and the spline quick-release head 541 forces a second ball into the second ball groove 538; and after the spline quick-release head 541 is completely inserted into the spline quick-release hole 537, the quick-release button 531 is released and forced towards the outer side of the end cover under the action of the reset spring, the second ball groove 538 on the inner side of the quick-release button 531 slides out of the corresponding position of the second ball, and the second ball is forced into the corresponding second ball locking groove 546 on the spline quick-release head so as to prevent the spline quick-release head 541 from falling off.

Further, with reference to FIG. 3a and FIG. 4a, a corresponding damping mechanism 55 also can be arranged in the quick-release rotating shaft connecting mechanism in this embodiment, i.e., a damping mechanism 55 is arranged in the sagittal axis mounting base 411 and/or the frontal axis mounting base 414, producing cushioning effect.

Figure 3B:
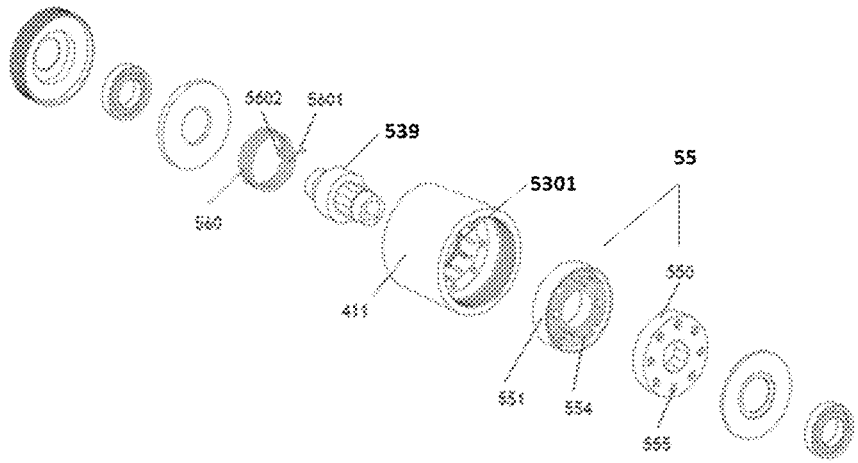
FIG. 3b and FIG. 3c are exploded views of a sagittal axis mounting base in FIG. 2b.
Figure 3C:
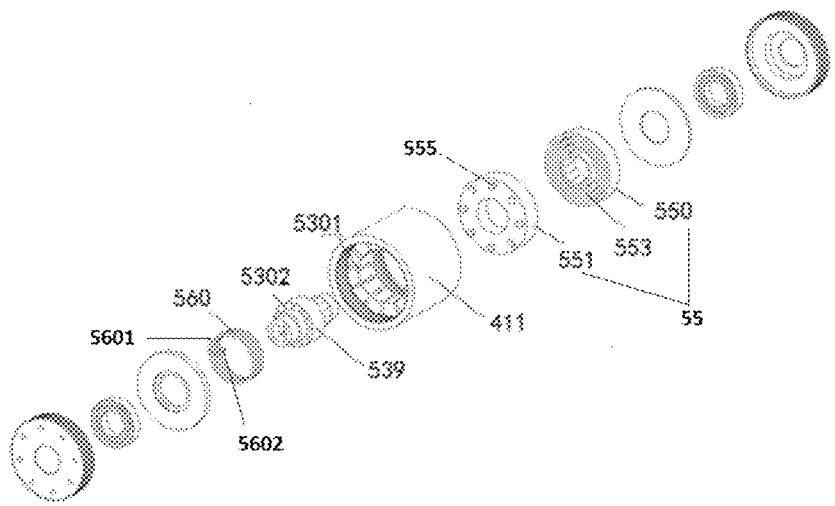

With reference to FIG. 3b and FIG. 3c, specifically, one end close to the insertion hole of the quick-release connector 544 (i.e., the sagittal axis I1) in the sagittal axis mounting base 411 is provided with a damping mechanism 55 which comprises a damping box inner cover 550 and a damping box outer cover 551 which are matched with each other, wherein quick-release button mounting holes matched with the quick-release button 531 are arranged in the damping box outer cover 551 and the middle of the damping box inner cover 550, a damping fluid diversion groove 553 is arranged on one side of the damping box inner cover 550 that faces the quick-release button 531 along the circumferential direction of the quick-release button mounting holes 552, a damping fluid fluctuation block 554 is arranged on one side of the damping box outer cover 551 that backs to the quick-release button 531 in a direction corresponding to the damping fluid diversion groove 553, and the damping box outer cover 551/the damping box inner cover 550 is uniformly provided with damping fluid injection holes 555 along the circumferential direction of the quick-release button mounting holes 552.

Figure 5A:
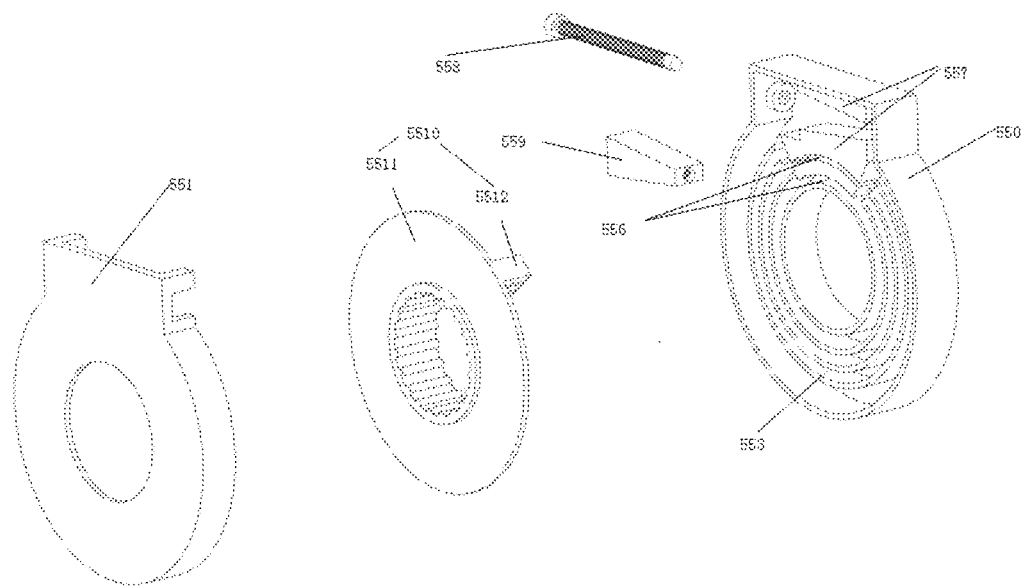
FIG. 5a, FIG. 5b, and FIG. 5c are schematic diagrams of an embodiment of an adjustable damping mechanism adopted in a sagittal axis mounting base of a hip mechanism in FIG. 2b.
Figure 5B:
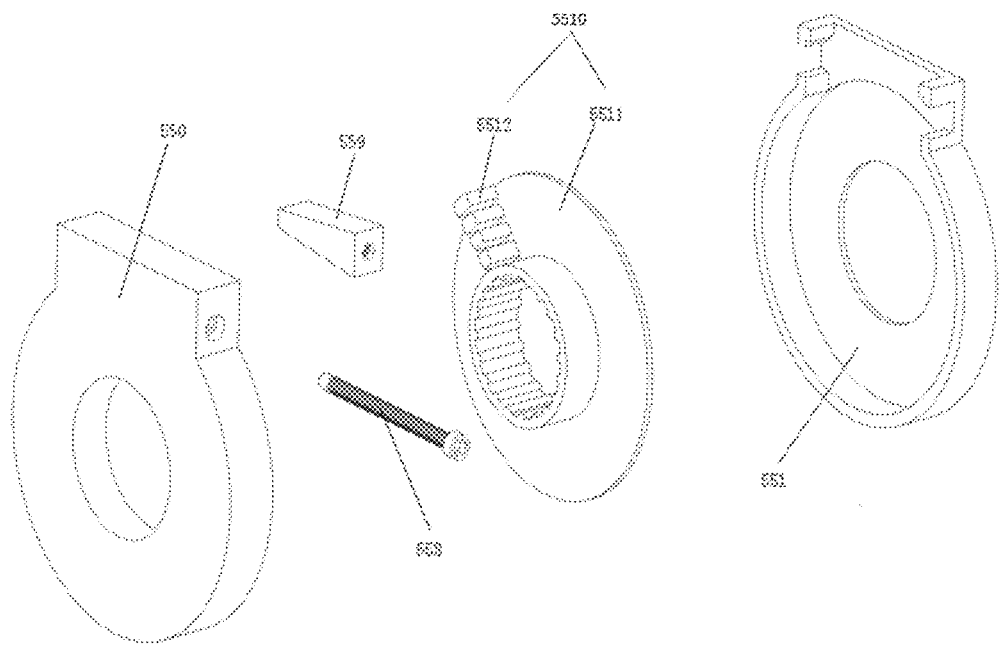
Figure 5C:
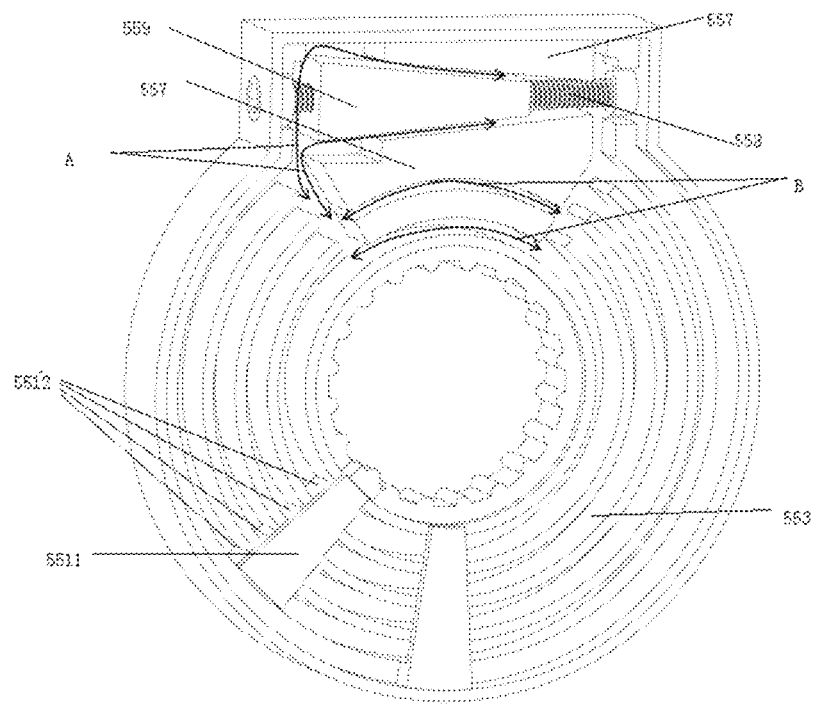

Of course, in some embodiments, the damping mechanism 55 can also be a damping mechanism with adjustable damping. Specifically, with reference to FIG. 5a, FIG. 5b, and FIG. 5c, quick-release button mounting holes matched with the quick-release button are arranged in the damping box outer cover 551 and the middle of the damping box inner cover 550. A damping fluid diversion groove 553 is arranged in the damping box inner cover 550, and a damping fluid overflow groove 556 is arranged at the top of the damping fluid diversion groove 553. An upper and a lower fixed wedge mouths 557 are arranged above the damping fluid overflow groove 556, and a damping adjusting knob 558 is arranged between the two fixed wedge mouths 557. The adjusting knob 558 is provided with an adjustable wedge surface 559 in a manner of moving leftwards and rightwards relative to the adjusting knob 558 so that a gap between the adjustable wedge surface 559 and the fixed wedge mouths 557 forms an adjustable flow path A of damping fluid, as shown in FIG. 5c. Thus, the left and right moving distance of the adjustable wedge surface 559 can be adjusted by rotating the adjusting knob 558 so as to change the size of the adjustable flow path A. The damping fluid overflow groove 556 forms a fixed flow path B of damping fluid, as shown in FIG. 5c, i.e., the flow of the circulating damping fluid is not adjustable. In addition, the damping mechanism 55 also comprises a damper shifting disk 5510 arranged between the damping box inner cover 550 and the damping box outer cover 551. The damper shifting disk 5510 comprises a disk body 5511, and a damping fluid shifting block 5512 arranged on the disk body 5511. In some embodiments, the damping fluid used in the damping mechanism 55 is silicone oil (a linear polysiloxane product that maintains in a liquid state at room temperature). In some specific embodiments of the present invention, when making the joints of the exoskeleton, materials with damping characteristics (such as rubber, damping composite materials, and damping paint) can be used to enhance the damping characteristics of various joints of the exoskeleton.

Further, a rebound mechanism 56 is respectively arranged in the sagittal axis mounting base 411 and the frontal axis mounting base 414 in this embodiment. Specifically, with reference to FIG. 4*a*, a single rebound mechanism 56 is arranged in the sagittal axis mounting base 411, and a double rebound mechanism is arranged in the frontal axis mounting base 414.

With reference to FIG. 3*b* and FIG. 3*c*, the single rebound mechanism in the sagittal axis mounting base 411 is a torsion spring 560. A torsion spring outer ear groove 5301 for accommodating an outer ear 5601 of the torsion spring 560 is arranged in the housing 530 of the quick-release head. A quick-release shaft sleeve 539 in the quick-release head is provided with a torsion spring inner ear hole 5302, and an inner ear 5602 of the torsion spring 560 is located in the torsion spring inner ear hole 5302. And the shaft sleeve is also provided with a quick-release hole matched with the quick-release connector (such as tenon).

With reference to FIG. 4*b*, FIG. 4*c*, FIG. 4*d* and FIG. 4*e*, the double rebound mechanism 56 in the frontal axis mounting base 414 comprises a two-way rebound mounting base 561 for mounting a resilient shaft sleeve 565. The two-way rebound mounting base 561 is provided with a clockwise rebound turbine 562*a* and an anticlockwise rebound turbine 562*b* respectively on the left and right sides, and a clockwise rebound worm 564*a* and an anticlockwise rebound worm 564*b* which are respectively matched with the clockwise rebound turbine 562*a* and the anticlockwise rebound turbine 562*b* at the top. The two-way rebound mechanism also comprises a clockwise rebound torsion spring 563*a* and an anticlockwise rebound torsion spring 563*b*, wherein the clockwise rebound torsion spring 563*a* and the anticlockwise rebound torsion spring 563*b* are respectively installed in shaft holes of the clockwise rebound turbine 562*a* and the anticlockwise rebound turbine 562*b*, and outer ears 5601 of the clockwise rebound torsion spring 563*a* and the anticlockwise rebound torsion spring 563*b* can be respectively inserted into outer ear jacks 5621 on the clockwise rebound turbine 562*a* and the anticlockwise rebound turbine 562*b* (further, the clockwise rebound turbine 562*a* and the anticlockwise rebound turbine 562*b* are provided with a plurality of outer ear jacks 5621 along the circumferential direction for pre-adjusting the pre-tightening force of the rebound torsion springs as required). The inner ears 5602 of the clockwise rebound torsion spring 563*a* and the anticlockwise rebound torsion spring 563*b* can be respectively inserted into inner ear chutes 5651*a* and 5651*b* on the left and right sides of the rebound shaft sleeve 565. And a clockwise rebound stopper 5611*a* and an anticlockwise rebound stopper 5611*b* are also respectively arranged in the two-way rebound mounting base 561, and a corresponding clockwise rebound shaft sleeve stopper 5653 and a corresponding anticlockwise rebound shaft sleeve stopper 5654 are respectively arranged in the inner ear chutes 5651*a* and 5651*b* on the left and right sides of the rebound shaft sleeve 565. When the quick-release connector (i.e., the frontal axis 12) is installed in the rebound shaft sleeve 565 and drives the shaft sleeve 565 to rotate clockwise, the clockwise rebound shaft sleeve stopper 5653 on the rebound shaft sleeve 565 drives the inner ear 5602 of the clockwise rebound torsion spring 563*a* in the two-way rebound mechanism to rotate therewith so as to generate reverse torque; and the anticlockwise rebound torsion spring 563*b* is blocked by the anticlockwise rebound stopper 5611*b* on the two-way rebound mounting base 561, and the reverse torque may not be transmitted to the quick-release connector shaft sleeve (such as spline shaft sleeve) in the rebound shaft sleeve 565 via the rebound shaft sleeve 565. Similarly, when the quick-release connector (i.e., the frontal axis 12) drives the quick-release connector shaft sleeve to rotate anticlockwise, the anticlockwise rebound stopper 5611*b* pushes the anticlockwise rebound torsion spring 563*b* to rotate so as to cause deformation of the anticlockwise rebound torsion spring 563*b*. On the contrary, the reverse torque generated to the shaft sleeve will increase as the degree of rotation increases. At this moment, the inner ear 5602 of the clockwise rebound torsion spring 563*a* is blocked by the clockwise rebound stopper 5611*a*. Therefore, the clockwise rebound worm 564*a* can be rotated to enable the clockwise rebound turbine 562*a* to rotate clockwise so as to increase the initial stress of the rebound torsion spring. In summary, in this embodiment, the clockwise rebound turbine 562*a*, the anticlockwise rebound turbine 562*b*, the clockwise rebound worm 564*a*, and the anticlockwise rebound worm 564*b* are arranged as initial stress regulating mechanisms of the two-way rebound mechanism so as to respectively adjust the initial stress of the clockwise rebound torsion spring and the anticlockwise rebound torsion spring. Thereby, the two-way rebound mechanism has the effect of two-way different rebound characteristics so as to improve the controllability and adaptability of the exoskeleton mechanism and can be adjusted according to physical characteristics of different users and different application scenarios.

In some embodiments, with reference to FIG. 2*a* and FIG. 2*b*, the slide rail mechanism 4152 is an arc-shaped slide rail with teeth on the inner side. Of course, the slide rail mechanism 4152 also can be in other shapes that fit the hip/waist shape of the human body.

Figure 6A:
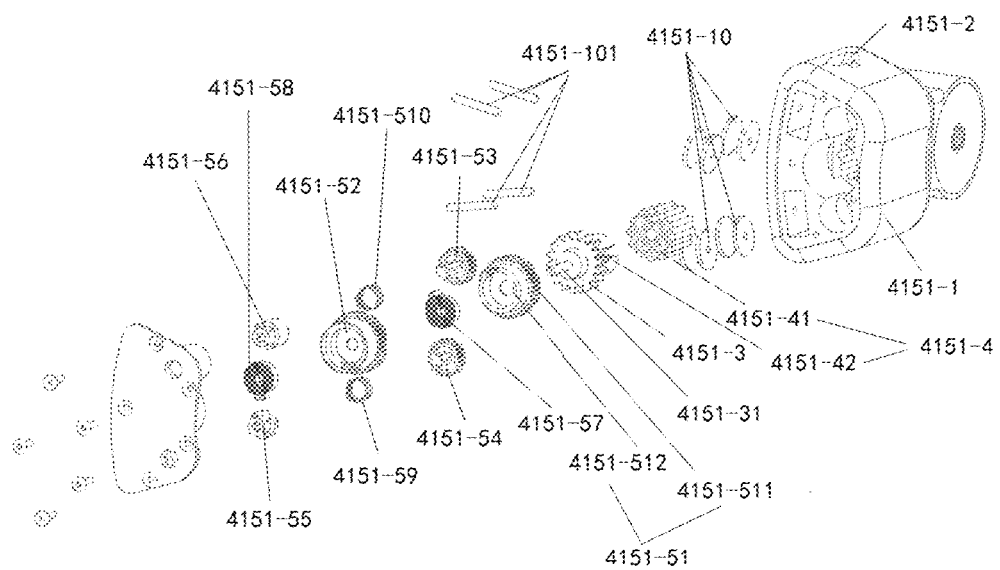
FIG. 6a and FIG. 6b are exploded views of an embodiment of a pulley mechanism in FIG. 2b.
Figure 6B:
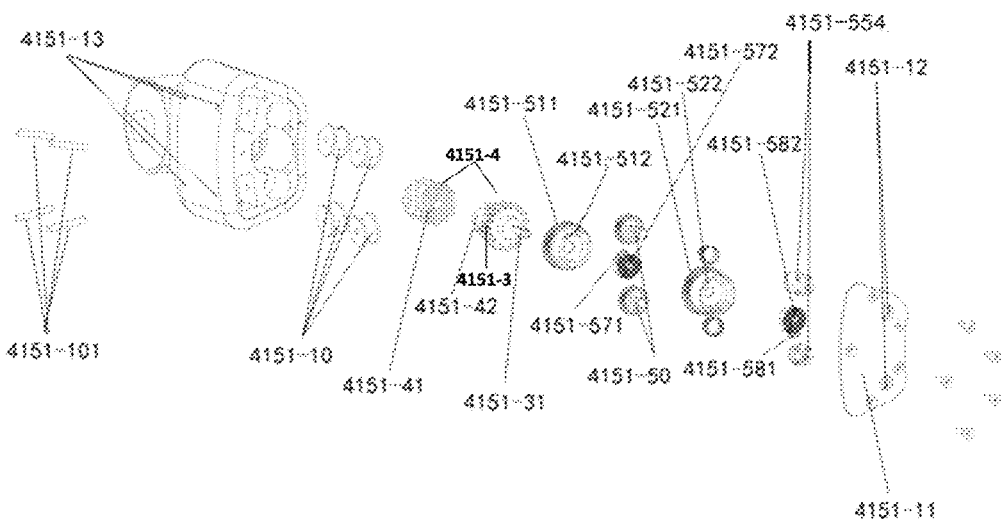
Figure 6C:
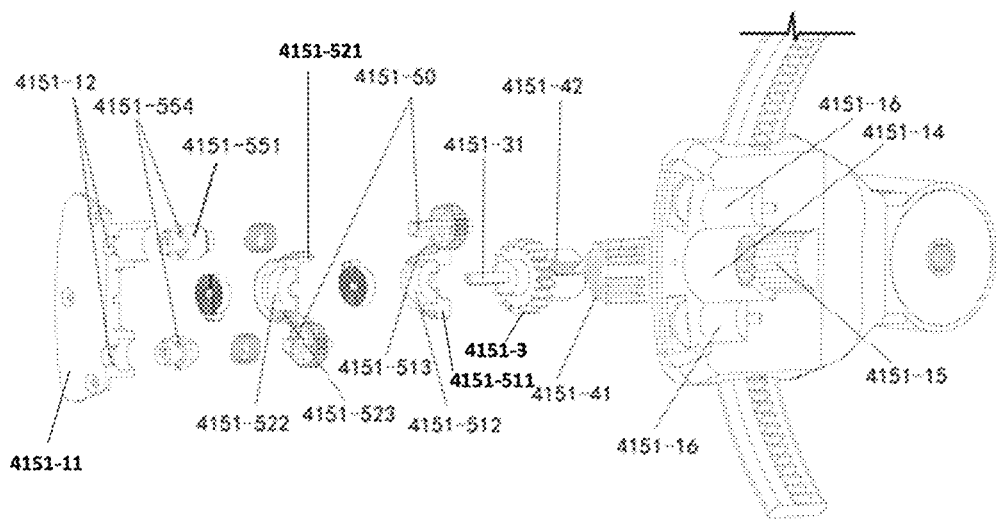
FIG. 6c and FIG. 6d are sectional views of an embodiment of a pulley mechanism in FIG. 2b.
Figure 6D:
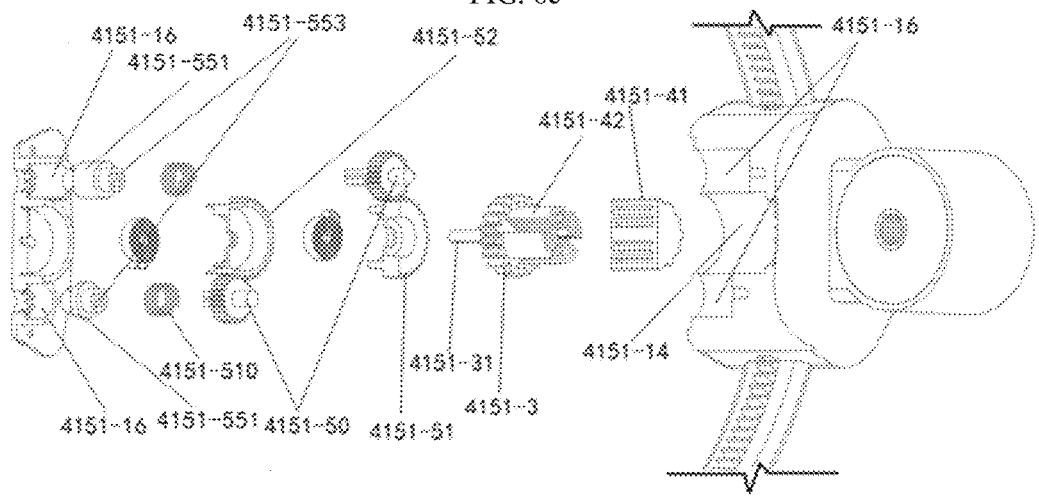

In this embodiment, with reference to FIG. 6*a*, FIG. 6*b*, FIG. 6*c*, FIG. 6*d* and FIG. 6*e*, the pulley mechanism 4151 comprises a pulley mounting seat 4151-1, slide rail meshing rollers 4151-10 (which are fixed in the pulley mounting seat 4151-1 of the pulley mechanism 4151 via roller pins 4151-101, and specifically, with reference to FIG. 6*b*, the top and the bottom of the side wall of the pulley mounting seat 4151-1 can be respectively provided with corresponding pin holes 4151-13 for fixing the roller pins 4151-101) respectively arranged at the inner top and bottom of the pulley mounting seat 4151-1 and meshed with the slide rail, and a slide rail meshing gear 4151-3 arranged in the pulley mounting seat 4151-1 and meshed with the teeth on the inner side of the slide rail (specifically, with reference to FIG. 6*c* and FIG. 6*d*, a slide rail meshing gear mounting groove 4151-14 is arranged in the pulley mounting seat 4151-1 so that the slide rail meshing gear 4151-3 can be installed in the mounting groove 4151-14), wherein the pulley mounting seat 4151-1 is provided with a slide rail through-hole 4151-2 penetrating the pulley mounting seat 4151-1 so that the pulley mounting seat 4151-1 is installed on the slide rail mechanism 4152 via the slide rail through-hole 4151-2 to drive the pulley mounting seat 4151-1 to move back and forth along the slide rail 4152 under the action of external force, thus realizing internal rotation or external rotation of the thigh connecting rod.

Figure 6E:
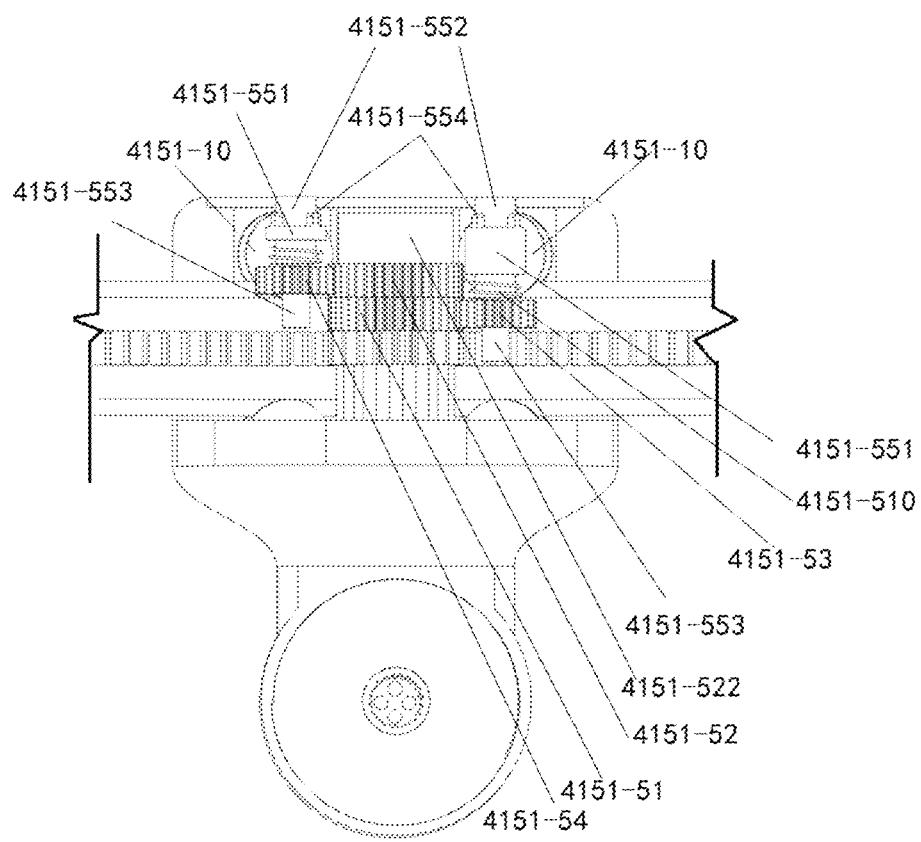
FIG. 6e, FIG. 6f, and FIG. 6g are schematic diagrams showing a two-way rebound and a slide rail meshing gear in a pulley mounting seat are matched.
Figure 6F:
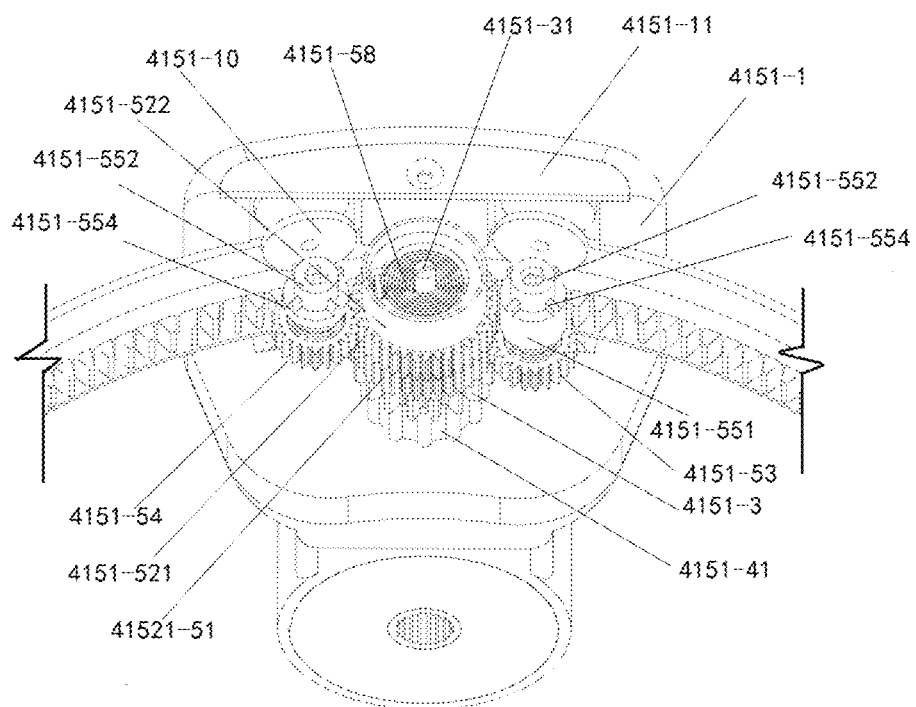
Figure 6G:
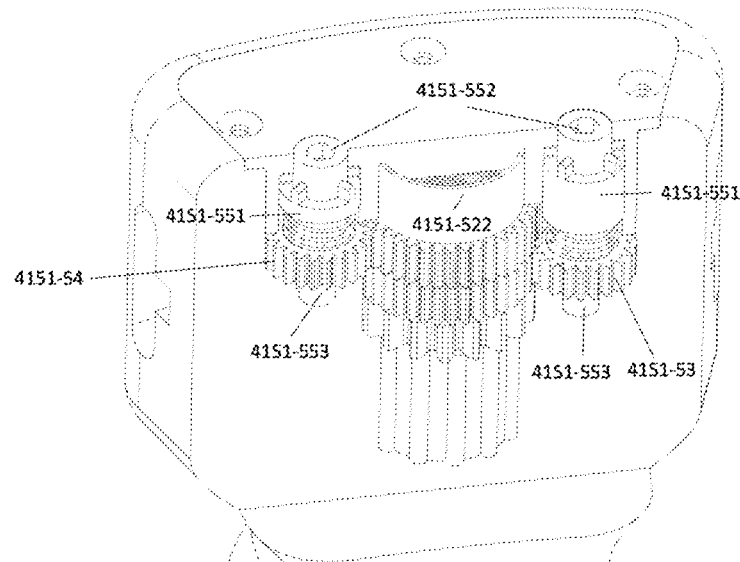
Figure 7A:
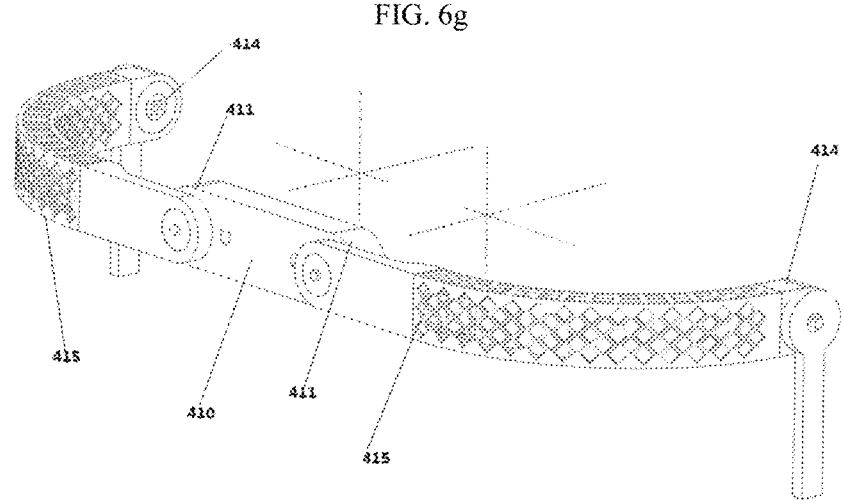
FIG. 7a is schematic diagram showing the structure of a second embodiment of a hip mechanism of an exoskeleton of the present invention.
Figure 7B:
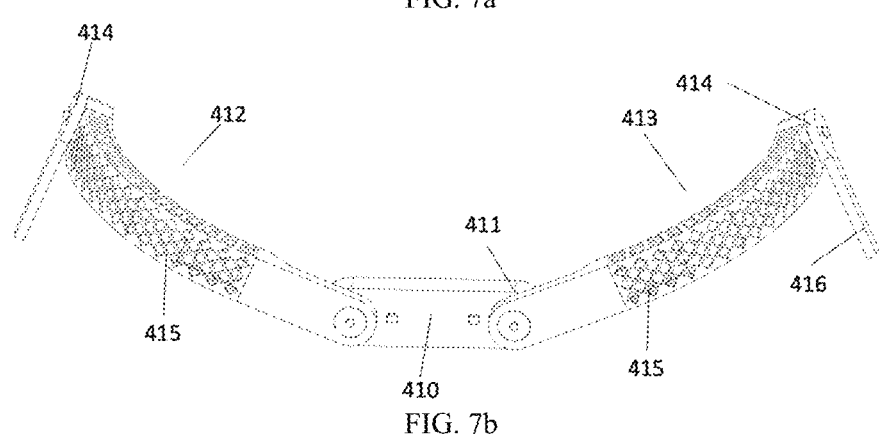
Figure 7C:
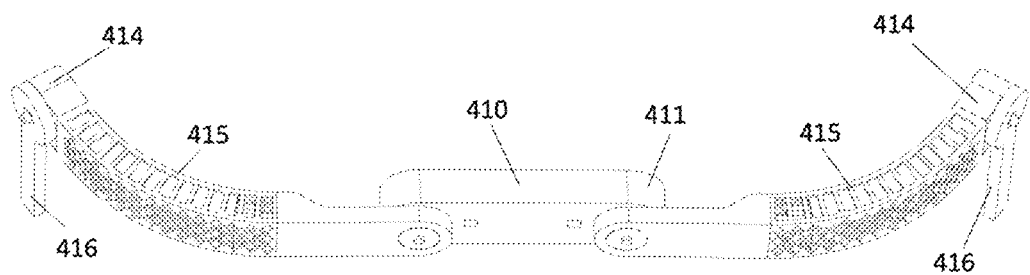
Figure 7D:
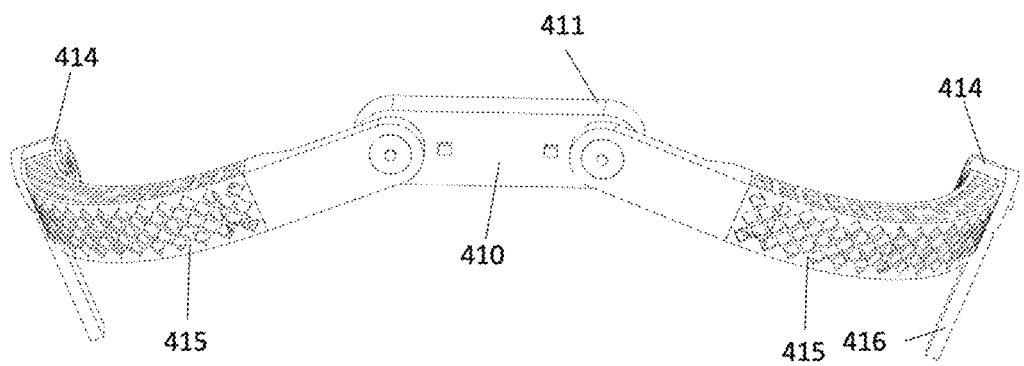
Figure 7E:
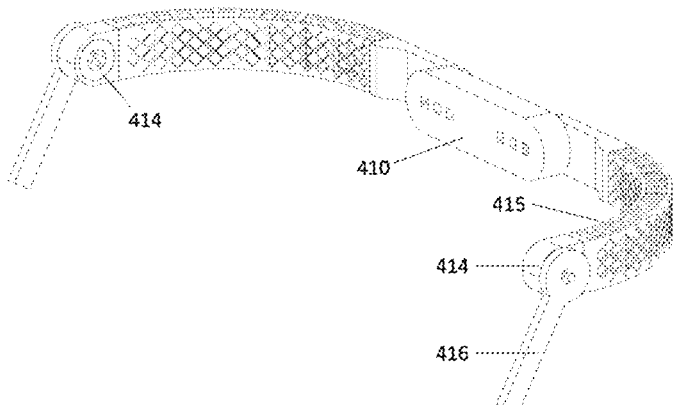
Figure 7F:
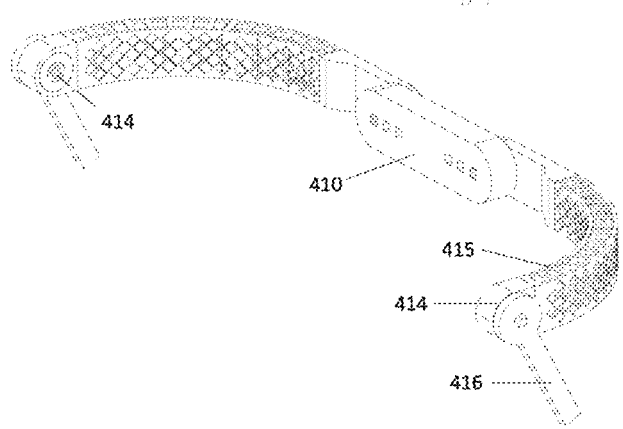
Figure 8A:
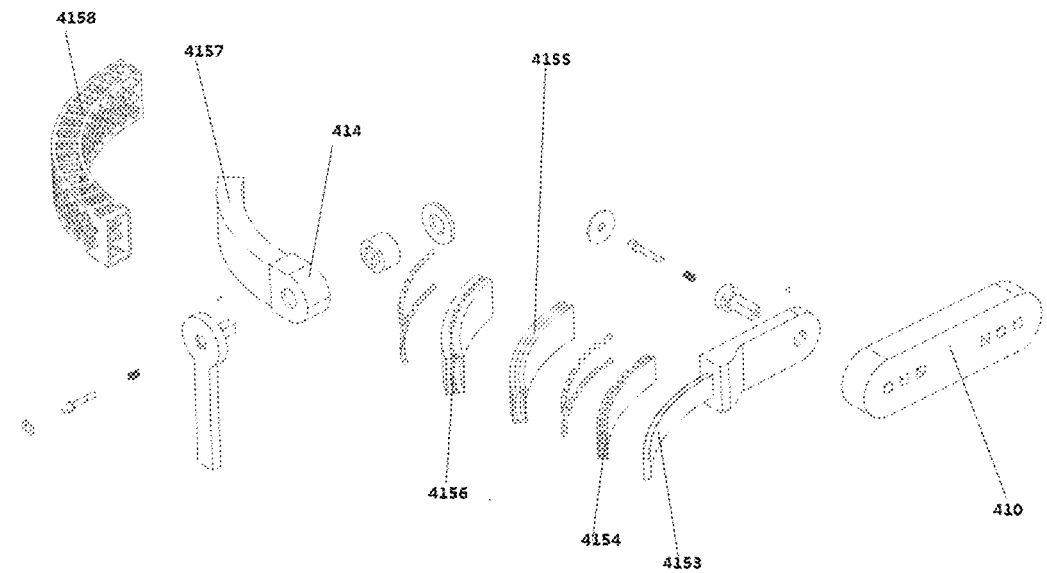
Figure 8B:
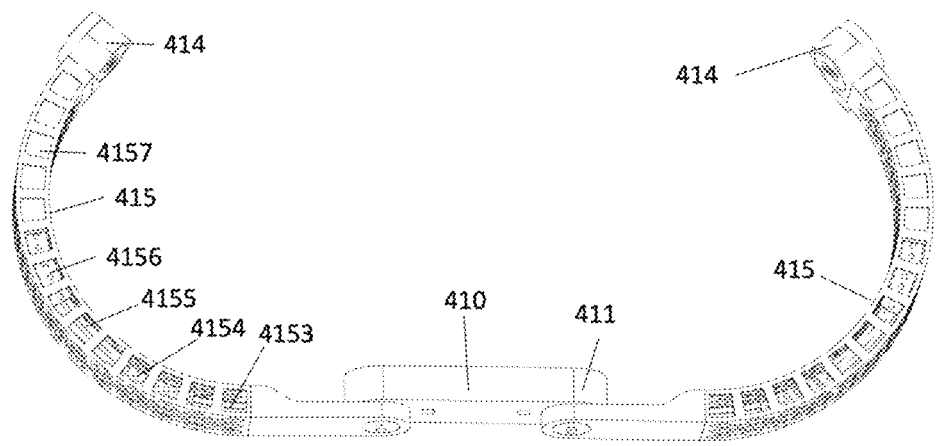
Figure 8C:
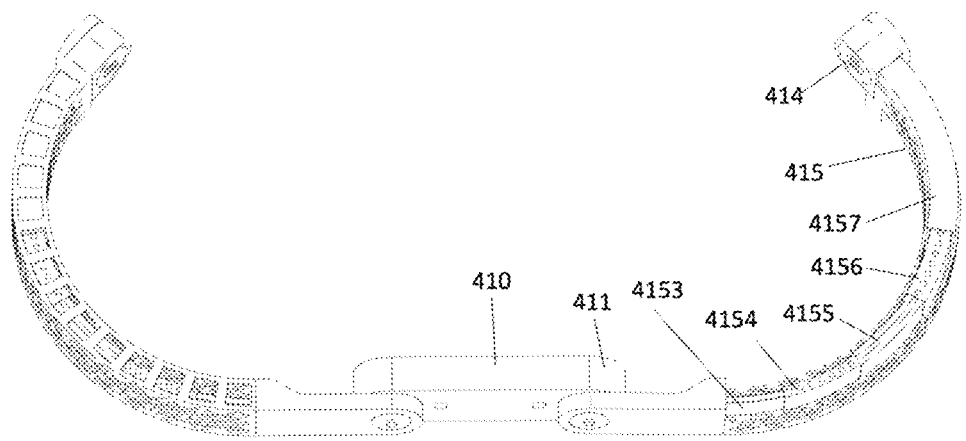
Figure 8D:
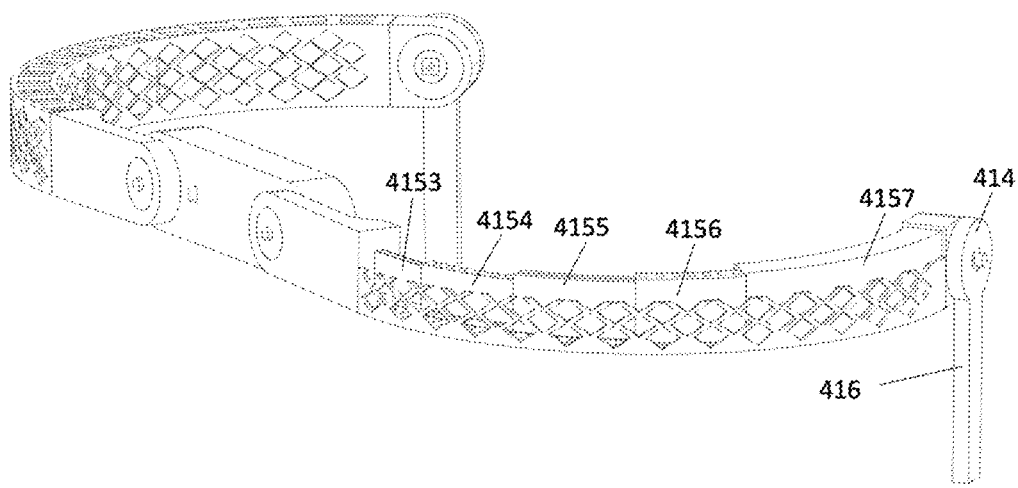
Figure 8E:
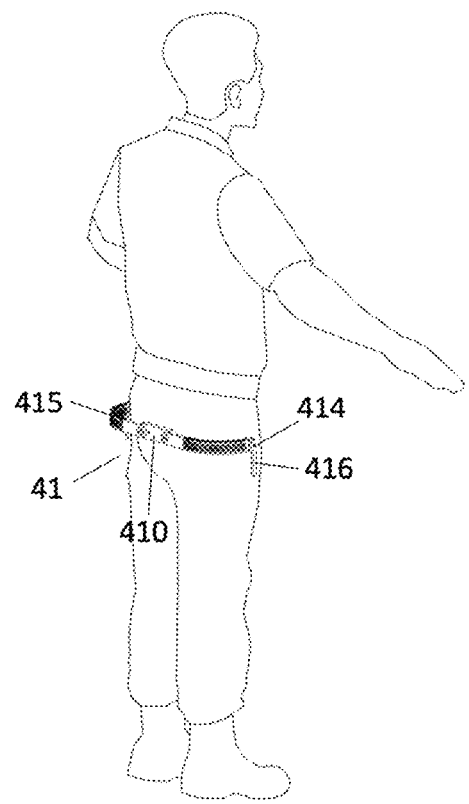
FIG. 8e is a schematic diagram of a hip mechanism in FIG. 7a worn at the hip of the human body.

Further, in this embodiment, a rotary damping mechanism 4151-4 and a two-way rebound mechanism 4151-5 are arranged in the pulley mounting seat 4151-1. Specifically, with reference to FIG. 6*a*, FIG. 6*b*, FIG. 6*c* and FIG. 6*d*, the rotary damping mechanism 4151-4 comprises a (spline) rotary damping box 4151-41 and a damping fluid shifting piece 4151-42 which are matched with each other. Specifically, with reference to FIG. 6*c*, a corresponding spline damping box mounting groove 4151-15 is arranged below the slide rail meshing gear mounting groove 4151-14 at the bottom of the pulley mounting seat 4151-1 to install the rotary damping box 4151-41 so that when the rotary damping box 4151-41 is installed in the damping box mounting groove 4151-15, the rotary damping box 4151-41 is located directly below the slide rail meshing gear 4151-3. Since the rotary damping fluid shifting piece 4151-42 is arranged coaxially with the slide rail meshing gear 4151-3 and located at the bottom of the slide rail meshing gear 4151-3, when the slide rail meshing gear 4151-3 is installed in the corresponding mounting groove in the pulley mounting seat 4151-1, the rotary damping fluid shifting piece 4151-42 at the bottom of the slide rail meshing gear 4151-3 is automatically inserted into and matched with the rotary damping box 4151-41 in the damping box mounting groove 4151-15, as shown in FIG. 6e and FIG. 6f.

With reference to FIG. 6a, FIG. 6b, FIG. 6c and FIG. 6d, the two-way rebound mechanism 4151-5 comprises: an external rotation mainspring fixing disk 4151-51, an internal rotation mainspring fixing disk 4151-52, an external rotation resilience adjusting gear 4151-53, an internal rotation resilience adjusting gear 4151-54, an internal rotation resilience adjusting button 4151-55, an external rotation resilience adjusting button 4151-56, an external rotation rebound mainspring 4151-57, and an internal rotation rebound mainspring 4151-58.

Wherein, the internal rotation mainspring fixing disk 4151-52 and the external rotation mainspring fixing disk 4151-51 are arranged coaxially with the slide rail meshing gear 4151-3 (and installed in the above-mentioned slide rail meshing gear mounting groove 4151-14. Of course, the top cover also can be correspondingly provided with an accommodating cavity for accommodating the mainspring fixing disks), and all three are arranged in sequence from top to bottom (specifically, rotating shaft through-holes can be respectively arranged at the central axis of the external rotation mainspring fixing disk 4151-51 and the internal rotation mainspring fixing disk 4151-52 so that a slotted rotating shaft 4151-31 of the slide rail meshing gear 4151-3 at the bottom is rotatably connected to the top cover 4151-11 of the pulley mounting seat via the rotating shaft through-holes in the external rotation mainspring fixing disk 4151-51 and the internal rotation mainspring fixing disk 4151-52 in sequence).

Wherein, the internal rotation mainspring fixing disk 4151-52 and the external rotation mainspring fixing disk 4151-51 respectively comprise an external rotation mainspring fixing disk gear 4151-511 and an internal rotation mainspring fixing disk gear 4151-521 used for being combined with the corresponding external rotation/internal rotation resilience adjusting gear and rotate therewith to fix the external rotation mainspring fixing disk 4151-511 above the slide rail meshing gear 4151-3. Therefore, the slide rail meshing gear 4151-3 is correspondingly provided with a lug boss, and an accommodating groove snugly matched with the lug boss is arranged at the bottom of the external rotation mainspring fixing disk gear 4151-511. Meanwhile, a raised external rotation mainspring locating slot 4151-512 is arranged at the top of the external rotation mainspring fixing disk gear 4151-511, an accommodating groove snugly matched with the external rotation mainspring locating slot 4151-512 is arranged at the bottom of the internal rotation mainspring fixing disk gear 4151-521, and of course, a raised internal rotation mainspring locating slot 4151-522 is arranged at the top so that when the external rotation rebound mainspring and the internal rotation rebound mainspring are respectively placed in the corresponding locating slots (i.e., external rotation mainspring locating slot and internal rotation mainspring locating slot), the outer ears 4151-571 and 4151-581 of the rebound mainsprings (i.e., external rotation rebound mainspring 4151-57 and internal rotation rebound mainspring 4151-58) are fixedly connected to mainspring fixing outer ear grooves arranged in the locating slots (external rotation mainspring locating slot 4151-512 and internal rotation mainspring locating slot 4151-522), and the inner ears 4151-572 and 4151-582 of the rebound mainsprings are matched with slots in the slotted rotating shaft penetrating the accommodating groove s and the locating slots.

Wherein, the internal rotation resilience adjusting gear 4151-54 and the external rotation resilience adjusting gear 4151-53 are respectively meshed with the internal rotation mainspring fixing disk 4151-52 and the external rotation mainspring fixing disk 4151-51, one end of a rotating shaft 4151-50 of the adjusting gear (i.e., internal rotation resilience adjusting gear 4151-54 and external rotation resilience adjusting gear 4151-53) is cylindrical and is installed in a mounting shaft locating hole located at the bottom of a resilience adjusting mechanism mounting chamber 4151-16, and one end matched with the adjusting button (i.e., internal rotation resilience adjusting button 4151-55 or external rotation resilience adjusting button 4151-56) is cruciform, i.e., the adjusting gear is fixed in the pulley mounting seat 4151-1 via the cylindrical end and matched with the adjusting button via the cruciform end.

Wherein, the internal rotation resilience adjusting button 4151-55 and the external rotation resilience adjusting button 4151-56 are installed at the top of the pulley mounting seat 4151-1 by means of rotating connection, and respectively located at both sides of the external rotation mainspring fixing disk 4151-51 and the internal rotation mainspring fixing disk 4151-52 which are arranged coaxially (specifically, a corresponding resilience adjusting mechanism mounting chamber 4151-16 is respectively arranged on the left and right sides of the slide rail meshing gear mounting groove 4151-14 in the pulley mounting seat 4151-1). Specifically, the adjusting button (i.e., internal rotation resilience adjusting button 4151-55 or external rotation resilience adjusting button 4151-56) comprises a cylindrical knob mounting base 4151-551 (the size of the knob mounting base of the external rotation resilience adjusting button 4151-55 is larger than that of the internal rotation resilience adjusting button 4151-56) which can be installed in a knob mounting groove of the top cover 4151-11 of the pulley mounting seat, knob bodies 4151-552 (of which the top is matched with a rotary clamping slot 4151-12 on the top cover 4151-11 of the pulley mounting seat) respectively located on both sides (i.e., top and bottom) of the knob mounting base 4151-551, and a sleeve 4151-553 matched with the rotating shaft 4151-50 of the adjusting gear, wherein each knob body 4151-552 is cylindrical, a hexagon hole is arranged in the knob body, and four rotary clamping pins 4151-554 (the number of which can be one, two, three or more than four) matched with the rotary clamping slot 4151-12 on the top cover 4151-11 of the pulley mounting seat are uniformly distributed along the circumferential direction on the cylinder wall close to the knob mounting base 4151-551. A cruciform inner hole matched with the cruciform rotating shaft of the adjusting gear is arranged in the sleeve 4151-553 so that the adjusting gear is matched with the adjusting button via the cruciform rotating shaft and the sleeve, and knob reset springs 4151-510, i.e., internal rotation resilience adjusting button reset spring 4151-59 and external rotation resilience adjusting button reset spring 4151-510, are arranged between the adjusting gear and the knob mounting base 4151-551 of the adjusting button.

Embodiment 2 a Rebound Telescoping Quick-Release Waist Device with Flexible Structure The present invention also provides another exoskeleton, comprising a hip mechanism 41. The hip mechanism 41 is the same as that in embodiment 1, comprising a hip base 410, and a left hip 412 and a right hip 413 which are installed on the left and right sides of the hip base via the sagittal axis mounting base 411. And the sagittal axes of the left hip 412 and the right hip 413 are respectively collinear (i.e., overlap or are in parallel) with the sagittal axes of the left and right thighs of the human body so that the thigh of the lower limbs of the exoskeleton can realize abduction or adduction. The left hip 412 and the right hip 413 also respectively comprise a frontal axis mounting base 414 and a movement rail 415 providing a movement track for the frontal axis mounting bases 414. The difference is that the movement rail 415 in this embodiment is a telescopic rod mechanism with the central axis coinciding with the vertical axis of the human body, one end is installed on the sagittal axis mounting base 411 via a sagittal axis, and the other end is fixedly connected to the frontal axis mounting base 414 so that when the telescopic rod is contracted, the frontal axis mounting base 414 is driven to rotate around the central axis of the telescopic rod.

With reference to FIG. 7 and FIG. 8, in a specific embodiment, the telescopic rod comprises an inner rail 4153, an inner ball retainer 4154, a middle rail 4155, an outer ball retainer 4156, an outer rail 4157 and a flexible porous cover 4158 which are sleeved in sequence, wherein the inner ball retainer 4154 is uniformly provided with a plurality of inner steel balls so that the inner steel balls can slide along the inner rail 4153, and the middle rail 4155 can slide along the inner ball retainer 4154; and the outer ball retainer 4156 is uniformly provided with a plurality of outer steel balls so that the outer steel balls can slide along the middle rail 4155, and the outer rail 4157 can slide along the outer ball retainer 4156.

Figure 9A:
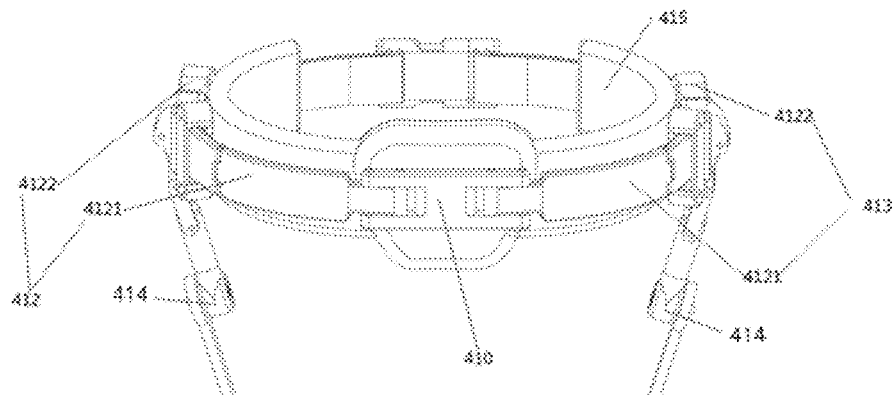
FIG. 9a is a schematic diagram showing the structure of a third embodiment of a hip mechanism of an exoskeleton of the present invention.
Figure 9B:
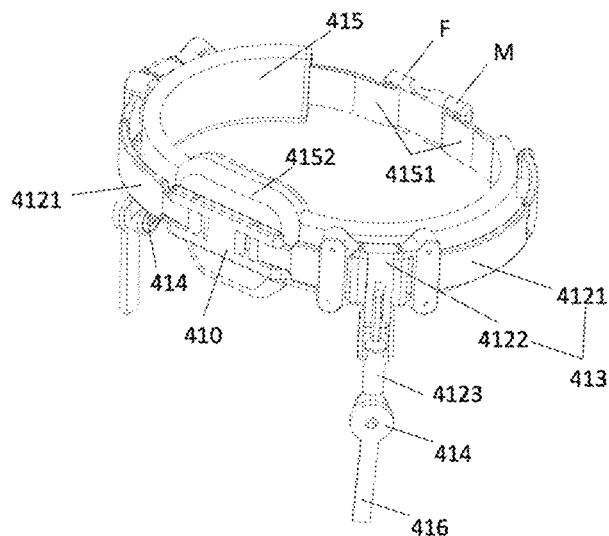
FIG. 9b is a schematic diagram showing that a variable-curvature pulley mechanism in FIG. 9a moves for a certain distance along a plurality of slide rails.

Embodiment 3 a Three Single-Axis Guide Rod Position-Changing Waist Device with a Plurality of Slide Rails The present invention also provides another exoskeleton, comprising a hip mechanism 41. The hip mechanism 41 has the same structure as that in embodiment 1, comprising a hip base 410, and a left hip 412 and a right hip 413 which are installed on the left and right sides of the hip base 410. However, the difference is that in this embodiment, no sagittal axis mounting base is arranged on the left and right sides of the hip base 410, and the left hip 412 and the right hip 413 are respectively hinged on the left and right sides of the hip base 410 and can rotate around the central axis or the vertical axis of the human body as the rotation axis in a horizontal plane, as shown in FIG. 9a and FIG. 9b.

Figure 9C:
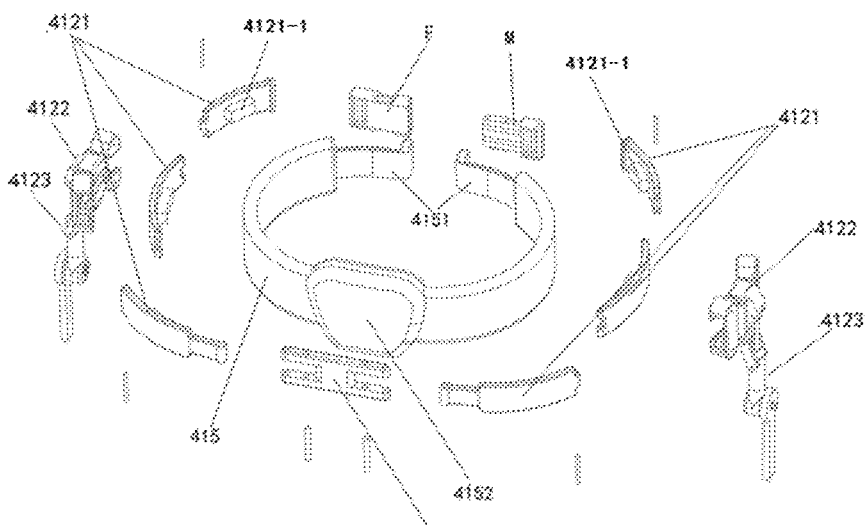
Figure 9D:
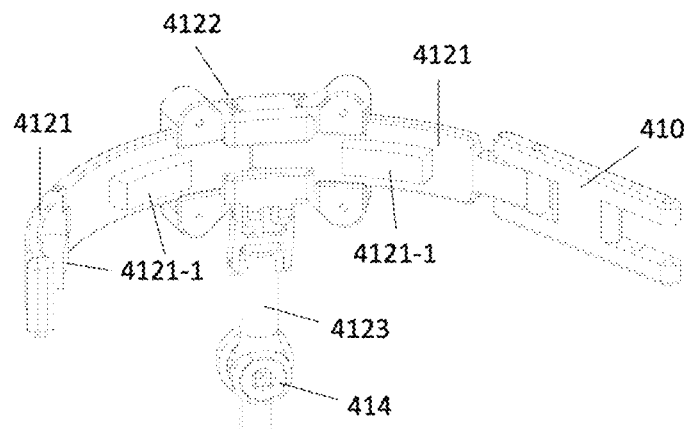
FIG. 9d is a schematic diagram showing that a variable-curvature pulley mechanism and a plurality of slide rails in FIG. 9a are matched.
Figure 9E:
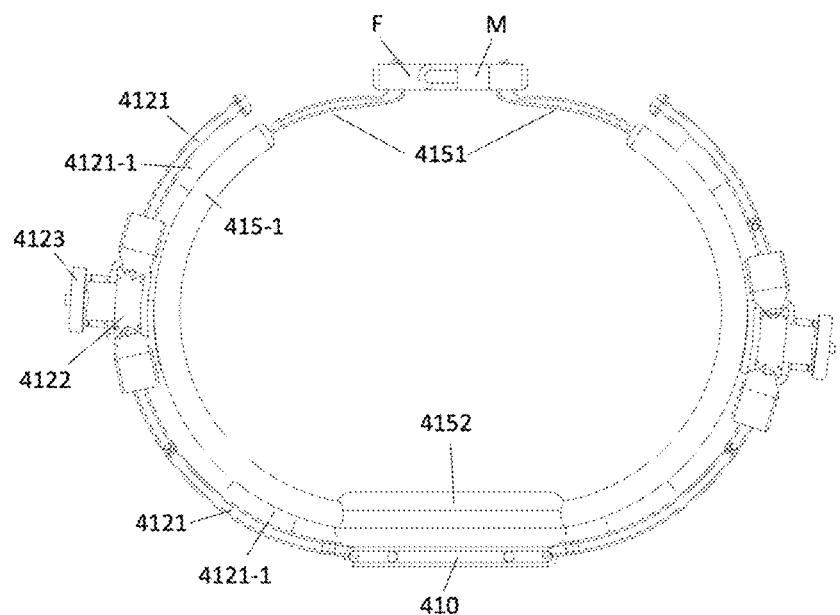
Figure 9F:
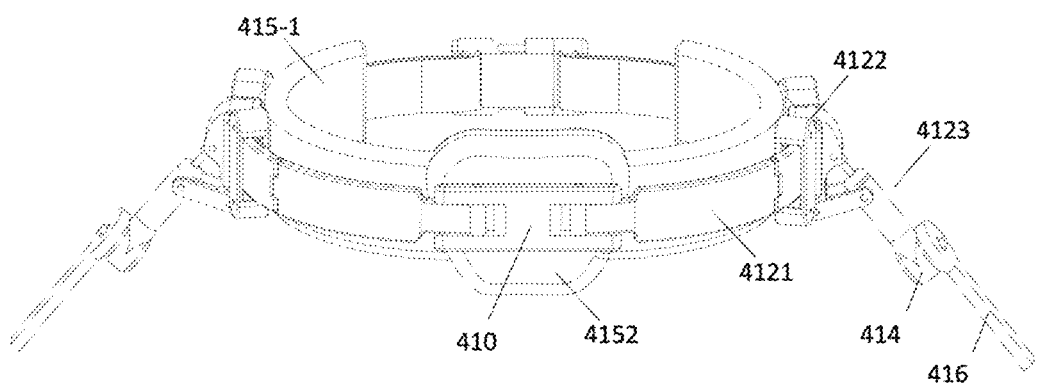
Figure 9G:
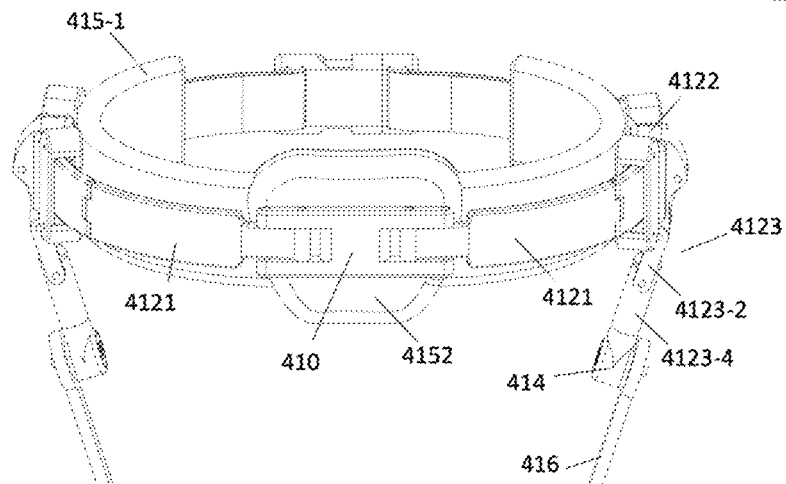
Figure 9H:
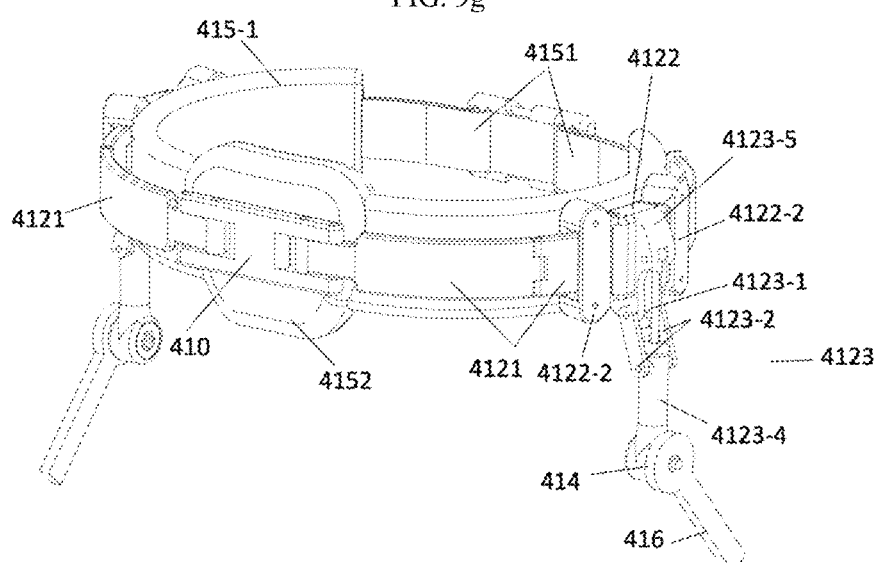

In a specific embodiment, with reference to FIG. 9c, the left hip 412 and the right hip 413 respectively comprise a movement rail composed of a plurality of slide rails 4121 connected end to end in sequence, a variable-curvature pulley mechanism 4122 and a guide rod position-changing mechanism 4123, and a frontal axis mounting base 414 is installed on the guide rod position-changing mechanism 4123, wherein the central axis of the movement rail formed by a plurality of slide rails 4121 connected end to end coincides with the vertical axis of the human body, the head end of the plurality of slide rails 4121 connected end to end is hinged with the hip base 410, and the tail end is connected to the tail end of the plurality of slide rails 4121 on the other side (specifically, a snap-fit male connector M and a snap-fit female connector F can be respectively arranged on the tail ends of both sides so that the tail ends of both sides are connected via clamping of the snap-fit male connector M and the snap-fit female connector F, and the clamping length of the snap-fit male connector M and the snap-fit female connector F can be adjusted so as to adjust the size of the movement rail). The variable-curvature pulley mechanism 4122 is installed on the plurality of slide rails 4121 and slides on the plurality of slide rails 4121 with the central axis of the plurality of slide rails 4121, i.e., the movement rail, as the rotation axis so that the frontal axis mounting base 414 can be driven by the variable-curvature pulley mechanism 4122 to move along the plurality of slide rails 4121.

Figure 10A:
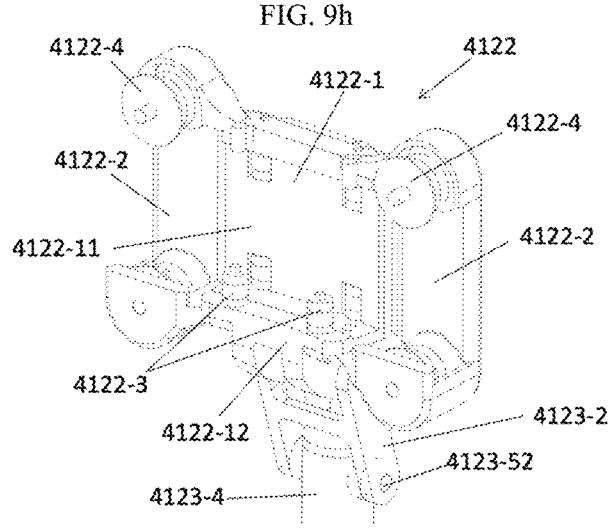
FIG. 10a is an assembly diagram showing a horizontal roller and a vertical roller in a variable-curvature pulley mechanism in FIG. 9d.
Figure 10B:
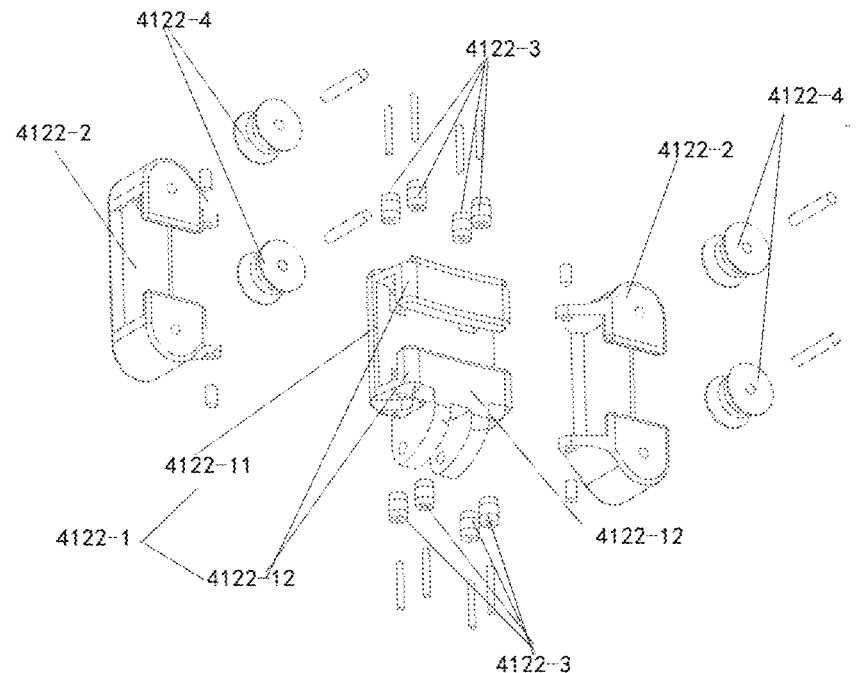
FIG. 10b is an exploded view showing an embodiment of a variable-curvature pulley mechanism in FIG. 9d.

With reference to FIG. 10a and FIG. 10b, in this embodiment, the variable-curvature pulley mechanism 4122 comprises a variable-curvature main pulley 4122-1, two side pulleys 4122-2, four horizontal rollers 4122-3 (of course, one, two, three or more than four horizontal rollers can be respectively arranged corresponding to the side pulleys), and four vertical rollers 4122-4 (of course, one, two, three or more than four vertical rollers can be respectively arranged corresponding to the side pulleys), wherein the variable-curvature main pulley 4122-1 comprises a side wall 4122-11 fitted to the slide rails and side pulley hinging seats 4122-12 arranged on the upper and lower sides of the side wall 4122-11, and the cross section of each side pulley hinging seat 4122-12 is L-shaped (i.e., the side pulley hinging seat 4122-12 at the top is inverted L-shaped) so that when the two side pulley hinging seats 4122-12 are respectively fixed on the upper and lower sides of the side wall 4122-11, the side wall is fitted to the outer side of the plurality of slide rails 4121, the long side of the L-shaped side pulley hinging seat 4122-12 is fitted to the inner side of the plurality of slide rails 4121, and corresponding horizontal roller mounting chambers are respectively arranged at the top and bottom of the side wall and the long sides of the two side pulley hinging seats so that the variable-curvature main pulley 4122-1 can slide along the slide rails. Correspondingly, vertical roller mounting chambers are respectively arranged at the top and bottom of each side pulley 4122-2 so that the side pulley can side along the slide rails. The vertical roller 4122-4 can adjust the orientation of the side pulley according to the curvature change of the slide rails so that the pulley mechanism can adapt to the effect of the curvature change of the plurality of slide rails. Such structural design allows the hip joint exoskeleton to adapt to wearers in different shapes more flexibly. Further, a stopper can be arranged at the hinge point of the side pulley hinging seats and the side pulleys or a limiting groove can be directly arranged to limit the rotation angle of the side pulleys 4122-2 relative to the main pulley 4122-1 so as to keep the rotation range controllable.

Figure 11A:
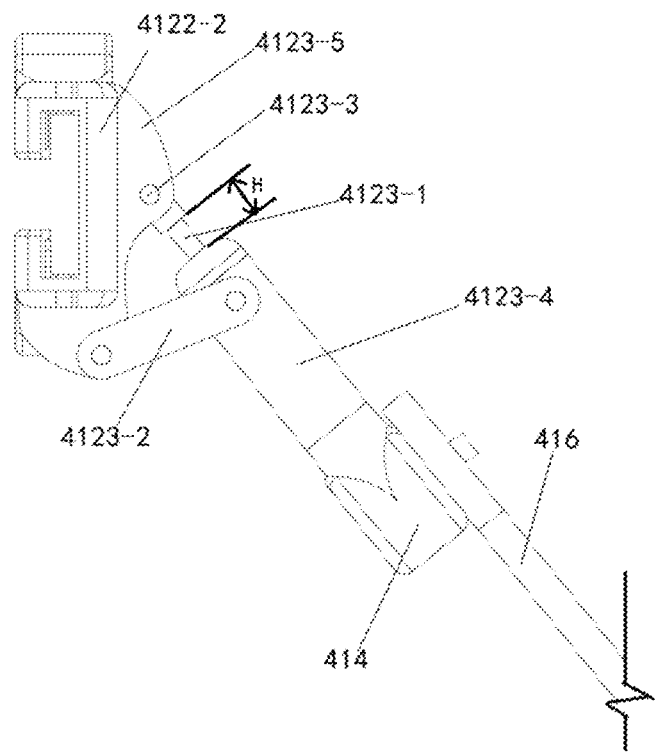
FIG. 11a is a schematic diagram showing the structure that a guide rod position-changing mechanism and a variable-curvature pulley mechanism in FIG. 9d are matched.

With reference to FIG. 11a, FIG. 11b and FIG. 11c, in this embodiment, the guide rod position-changing mechanism 4123 comprises a guide rod 4123-1, a rocker 4123-2, a sagittal axis 4123-3, a piston cylinder 4123-4, and a base 4123-5, wherein the base 4123-5 is fixed to the outer side of the side wall of the main pulley 4122-1, a guide rod pin hole 4123-51 and a rocker pin hole 4123-52 are respectively arranged in the middle and at the bottom, one end of the guide rod 4123-1 is fixedly connected to a piston head by penetrating the piston cylinder 4123-4 (specifically, with reference to FIG. 11b, one end of the guide rod 4123-1 penetrates the cylinder cover of the piston cylinder and extends into the piston cylinder to be fixedly connected to the piston head 4123-41), and the other end is rotatably connected to the sagittal axis 4123-3 via a guide rod sleeve 4123-11. The sagittal axis 4123-3 is horizontally fixed to the base 4123-5 via the guide rod pin hole 4123-51 and can rotate relative to the base 4123-5. The cylinder head of the piston cylinder 4123-4 is also provided with a hinge hole, and both ends of the rocker 4123-2 are respectively hinged at the bottom of the base 4123-5 and the cylinder head of the piston cylinder 4123-4 via pins, the rocker pin hole 4123-52 and the hinge hole in the cylinder head. A frontal axis mounting base 414 is fixed at the bottom of the piston cylinder 4123-4.

In this embodiment, both ends of the rocker 4123-2 are respectively hinged with the bottom of the base 4123-5 and the cylinder head of the piston cylinder 4123-4 so that the base 4123-5, the guide rod 4123-1, the piston cylinder 4123-4, and the rocker 4123-2 form a guide rod slide block mechanism, and the base 4123-5 fixed on the variable-curvature main pulley 4122-1 is used as a rack of the four-rod mechanism so that when the piston and the guide rod rotate with the thighs, the distance H between the cylinder head of the piston cylinder 4123-4 and the top end of the guide rod 4123-1 gradually changes, as shown in FIG. 11a, FIG. 11c and FIG. 11d, i.e., when the thighs are abduced, the distance between the cylinder head of the piston cylinder 4123-4 and the top of the guide rod 4123-1 gradually decreases; and when the thighs are adducted, the distance between the cylinder head of the piston cylinder 4123-4 and the top of the guide rod 4123-1 gradually increases until the limit position, as shown in FIG. 11d. At this time, the axis of the guide rod 4123-1 is collinear with the connecting line of two hinge holes of the rocker 4123-2. In the state of limit position, if the thighs continue to be adducted, the distance between the piston cylinder 4123-4 and the top of the guide rod 4123-1 will decrease.

Further, in this embodiment, a part of damping fluid (for example, silicone oil damping fluid) can be introduced into the piston chamber of the piston cylinder 4123-4. Since small holes in the piston head 4123-41 can communicate the chambers on the upper and lower ends of the piston head. But due to their small pore diameter, the piston head 4123-41 will cause the damping fluid to slowly flow via the through-holes of the piston head 4123-41 when moving up and down in the chambers. On the other hand, since the sectional area of the guide rod 4123-1 is close to that of the chamber of the piston cylinder 4123-4, when the guide rod 4123-1 is inserted into the piston cylinder 4123-4, the residual space (containing damping fluid and air) in the piston cylinder 4123-4 is far less than the total residual volume when the guide rod 4123-1 is completely outside the piston cylinder 4123-4, that is to say, when the guide rod 4123-1 is pressed into the piston cylinder 4123-4, the total volume of the air-liquid mixture (mixture of air and silicone oil) in the piston cylinder 4123-4 is compressed, and the intensity of pressure increases, thus providing reverse thrust for the guide rod 4123-1. The small holes in the piston head 4123-41 allow the guide rod 4123-1 being inserted or taken out to have obvious damping force so that the motion of the exoskeleton mechanism is more stable and smooth under the action of resistance.

Further, with reference to FIG. 9c, in order to improve the comfort of a wearer, the hip mechanism of this embodiment also comprises a flexible waist belt 415-1, and a plurality of slide rails 4121 are fitted to the outer side of the flexible waist belt 415-1 along the length direction of the flexible waist belt 415-1. Specifically, a fixed bump 4121-1 is arranged on the inner side of the plurality of slide rails 4121 so that after the plurality of slide rails 4121 on both sides are clamped via a snap-fit female connector F and a snap-fit male connector M, the fixed bump 4121-1 is pressed on the flexible waist belt so as to fix the hip mechanism to the wearer's waist. Furthermore, a waist bandage 415-11 for adjustment can also be arranged on both ends of the flexible waist belt 415-1, and a back sponge pad 415-12 is arranged in the position corresponding to the hip base 410.

Embodiment 4

The present invention also provides another exoskeleton that comprises any one of hip mechanisms in the above-mentioned embodiments 1-3, which is not described herein again. The difference is that the hip mechanism of the exoskeleton of this embodiment also comprises a hip width adjusting member 417 arranged on the hip base 410, i.e., the left hip 412 and the right hip 413 are driven by the hip width adjusting member to horizontally move towards or away from on the hip base 410 so as to adjust the distance between the left hip 412 and the right hip 413 so that the hip mechanism 41 can adapt to wearers with different waist circumferences.

Figure 12:
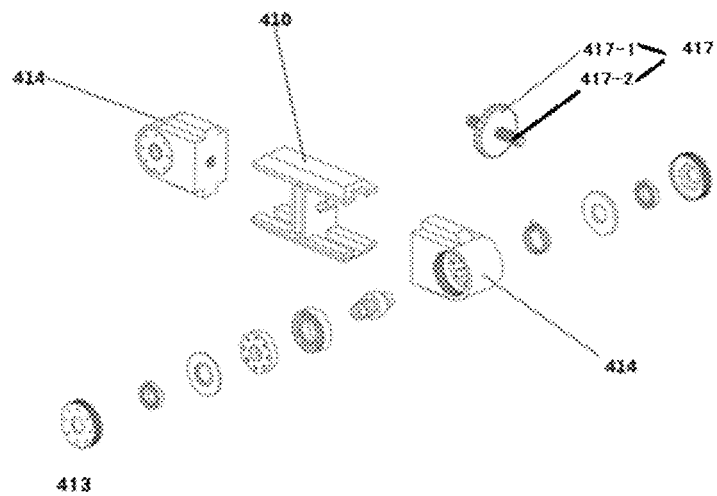
FIG. 12 is an exploded view of an embodiment of a hip base with adjustable width in a hip mechanism of an exoskeleton of the present invention.

In a specific embodiment, with reference to FIG. 12, the hip width adjusting member 417 has a shifting disk 417-1. And both sides of the shifting disk 417-1 are respectively arranged on a plus thread and a minus thread lead screws 417-2. The frontal axis mounting bases 414 on the left and right sides are respectively connected to the threads on both ends of the lead screws 417-2. The left hip 412 and the right hip 413 are rotatably connected to the frontal axis respectively via the corresponding rotating shafts. When the shifting disk 417-1 in the middle of the lead screws 417-2 is shifted, the lead screws drive the left hip 412 and the right hip 413 to horizontally move towards to reduce the hip width or to horizontally move away from to increase the hip width on the hip base 410, thus adapting to wearers with different widths of hip/waist.

Of course, in this embodiment, an I-shaped hip base can also be directly used. Then, the left and right sides of the hip base are respectively provided with a plurality of width adjusting holes. And one end of the left hip and one end of the right hip respectively match with the width adjusting holes on the left and right sides of the hip base by their corresponding rotating shafts so as to be rotatably connected to the hip base so that the width adjustment of the hip is realized by matching the left hip and the right hip with the width adjusting holes in different positions.

Embodiment 5

Figure 13:
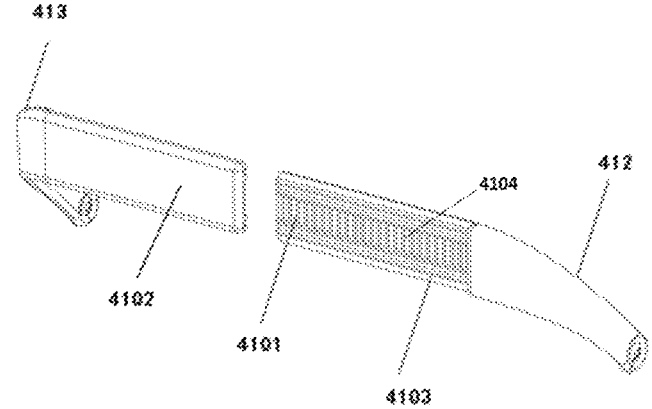
FIG. 13 is an exploded view of another embodiment of a hip base with adjustable width in a hip mechanism of an exoskeleton of the present invention.

The present invention also provides another exoskeleton, comprising a hip mechanism in any one of embodiments 1-3, which are not described herein again. The difference is that with reference to FIG. 13, in this embodiment, the hip base 410 also can be realized directly by a left slide block 4101 and a right slide block 4102 which can slide relative to each other in a horizontal direction (the left slide block is connected to one end of the left hip 412, and the right slide block is connected to one end of the right hip 413). The left slide block 4101 is provided with an upper and a lower rails 4103 which are parallel to each other in a horizontal direction, and correspondingly, the right slide block 4102 is provided with an upper and a lower lug bosses which are parallel to each other in a horizontal direction, that is, the width of the hip mechanism is adjusted by controlling the left and right sliding distance of the lug bosses on the rails 4103. Further, a plurality of vertical latches 4104 are respectively arranged between the upper and the lower rails 4103 and between the upper and the lower lug bosses so that the connection length of the hip mechanism and a back-carrying load assisting system can be adjusted by controlling the meshing height of the latches between the left slide block 4101 and the right slide block 4102 to adapt to different body structures.

Embodiment 6

In some embodiments, the present invention also provides a waist exoskeleton device 100, wherein, comprising a waist slide rail 200, a waist pulley 202 and a waist elastic mechanism 210; the waist pulley 202 can slide along the waist slide rail 200; and the waist elastic mechanism 210 is placed on the waist slide rail and connected to the waist pulley 202, and provides elastic energy storage during the sliding process of the waist pulley 202 along the waist slide rail 200.

In the prior art, in order to enable an exoskeleton to better pass the weight of the bearing load to a lower limb exoskeleton via a waist exoskeleton and then to the ground, a waist exoskeleton and a lower limb exoskeleton (for example, a thigh exoskeleton) are connected together and often cannot be separated to rotate respectively, which limits the degrees of freedom of rotation of the waist relative to the thighs of the human body. In the present invention, the degrees of freedom of left and right rotation of the waist (i.e., rotation around the vertical axis of the human body, for example, internal rotation and external rotation) is increased by changing the connection mode of the waist and the lower limb exoskeleton to the mode of a pulley and a slide rail, and the rotation amplitude of the waist is limited and controlled via an elastic energy storage device, which ensures smooth transmission of bearing force from top to bottom and has no influence on the overall weight-bearing effect of the exoskeleton.

In some embodiments, a waist-circling groove 204 for the waist elastic mechanism 210 to slide is arranged on the waist slide rail 200, and provides damping force to control and stabilize the movement of an exoskeleton wearer—the groove part is marked as 209. The waist elastic mechanism 210 is placed in the groove 209 of the waist-circling groove 204.

Figure 21A:
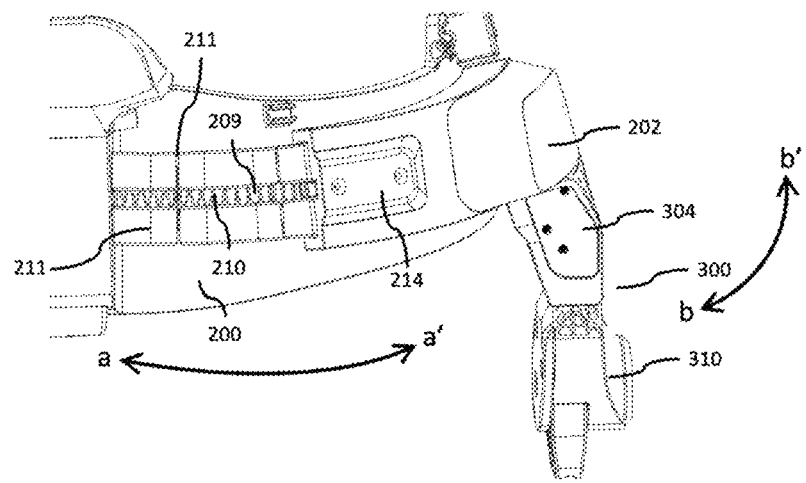
FIG. 21a is a schematic diagram showing the local structure of an embodiment of a waist exoskeleton device of the present invention.
Figure 21B:
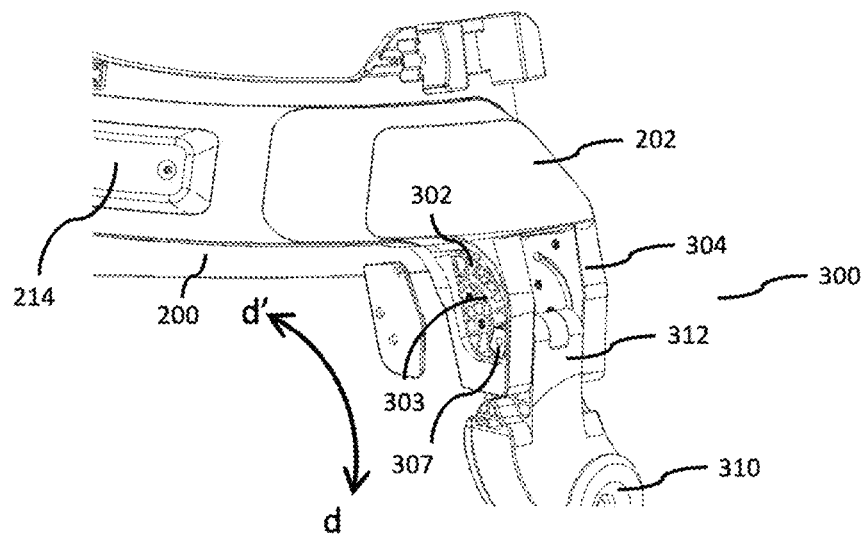
FIG. 21b is a schematic diagram showing the local structure of an embodiment of a waist exoskeleton device of the present invention.

In some embodiments, the waist slide rail 200 is also provided with a waist pulley connecting block 212, and the waist pulley connecting block 212 can be fixedly connected to a corresponding waist elastic mechanism connecting member 214 on the waist pulley 202 via screws/bolts 216. In some embodiments, tension springs are arranged on both sides of the waist pulley connecting block 212. When the waist pulley 202 slides relative to the waist slide rail 200 (for example, when a person rotates the waist while standing, the waist pulley 202 is pulled by the lower limb exoskeleton and cannot move, and the waist slide rail 200 moves following the motion of the waist of the human body in the aa' direction (FIG. 21a), i.e., rotation around the vertical axis of the human body, for example, internal rotation and external rotation), the tension spring on one side of the waist pulley connecting block 212 is stretched, and the tension spring on the other side of the waist pulley connecting block 212 is compressed, which brings damping for rotation of the waist and prevents the human body from rotating the waist too fast or too substantially. This increases the flexibility during rotation of the waist, but it is controllable, stable and smooth, avoiding accidents during fast or substantial rotation. Please note that the waist elastic mechanism 210 not only can adopt the tension spring mechanism in the drawings but also can adopt a pneumatic pusher or damping fluid to produce damping effect.

In some embodiments, the notch of the waist-circling groove 204 is provided with a baffle 218 which fixedly seals the waist elastic mechanism 210 in the groove 209 of the waist-circling groove 204.

Figures 14A, 14B:
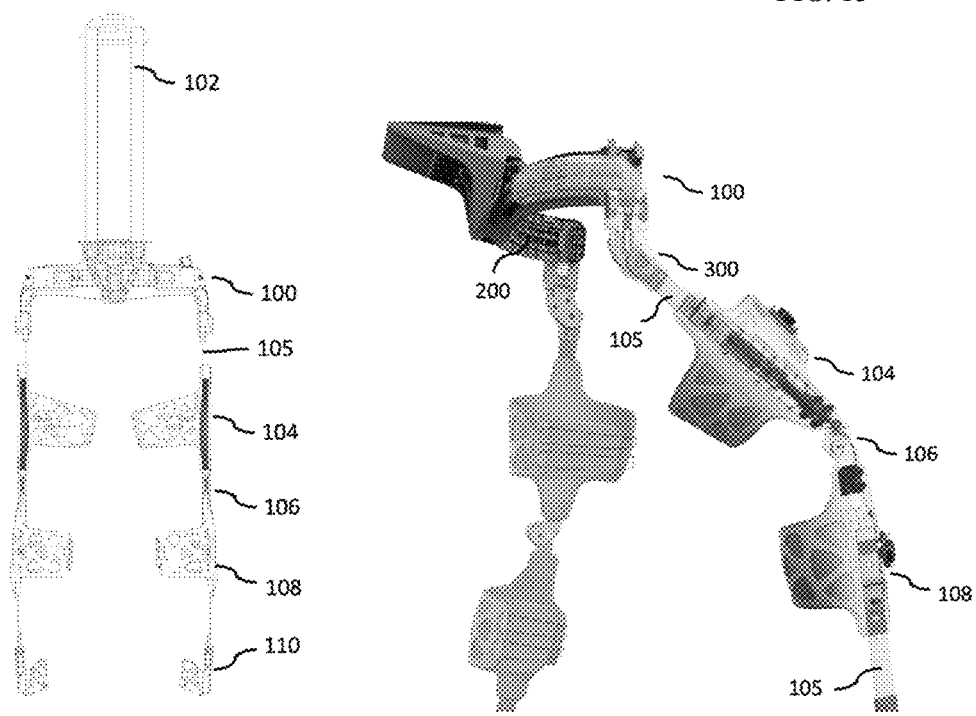
FIG. 14a is a schematic diagram (front view) showing the structure of a whole-body exoskeleton comprising an embodiment of a waist exoskeleton device of the present invention.
FIG. 14b is a schematic diagram (perspective view) showing the structure of an exoskeleton comprising an embodiment of a waist exoskeleton device of the present invention.
Figure 14C:
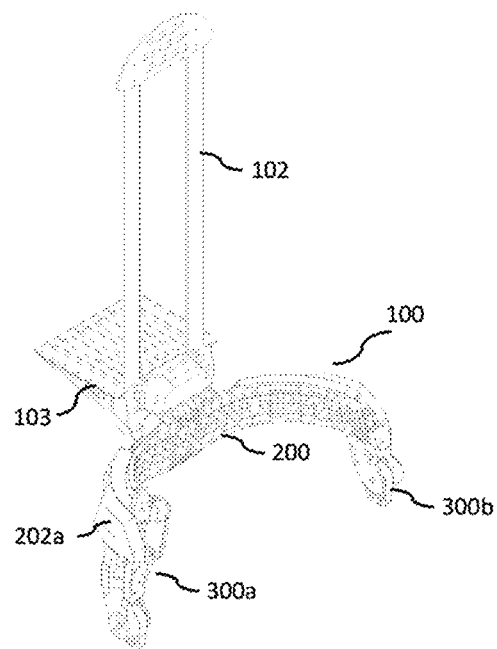
FIG. 14c is a schematic diagram (perspective view) showing the structure of an exoskeleton comprising an embodiment of a waist exoskeleton device of the present invention.
Figure 15A:
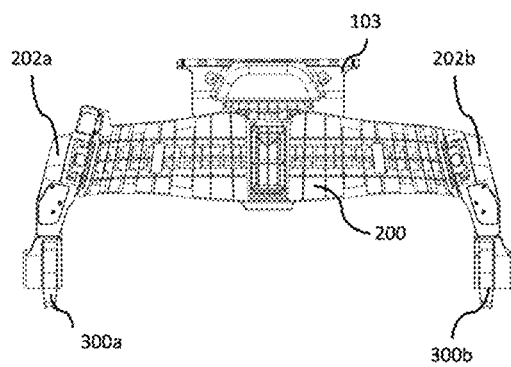
FIG. 15a is a schematic diagram (front view) showing the structure of an embodiment of a waist exoskeleton device of the present invention.
Figure 15B:
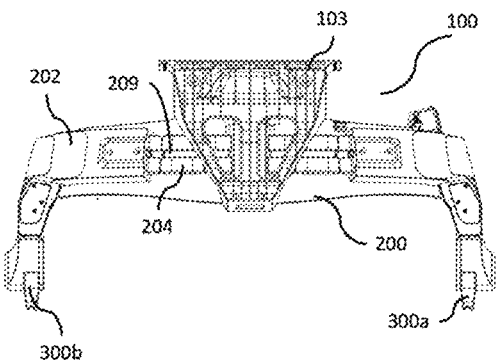
FIG. 15b is a schematic diagram (back view) showing the structure of an embodiment of a waist exoskeleton device of the present invention.
Figure 16A:
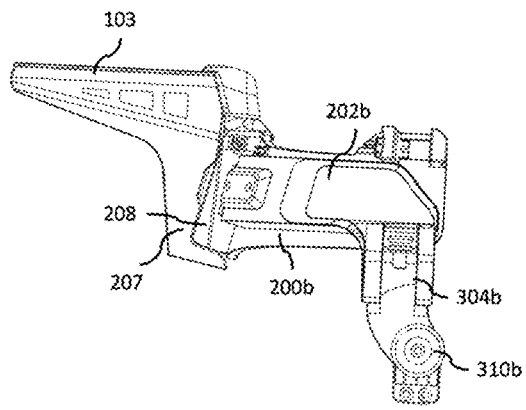
FIG. 16a is a schematic diagram (left view) showing the structure of an embodiment of a waist exoskeleton device of the present invention.
Figure 16B:
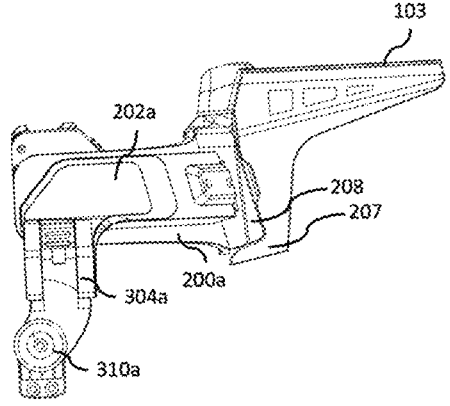
FIG. 16b is a schematic diagram (right view) showing the structure of an embodiment of a waist exoskeleton device of the present invention.
Figure 17A:
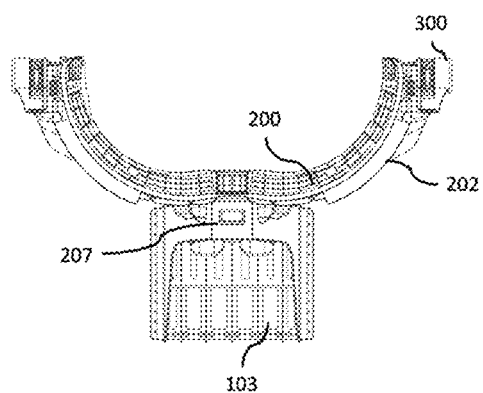
FIG. 17a is a schematic diagram (bottom view) showing the structure of an embodiment of a waist exoskeleton device of the present invention.
Figure 17B:
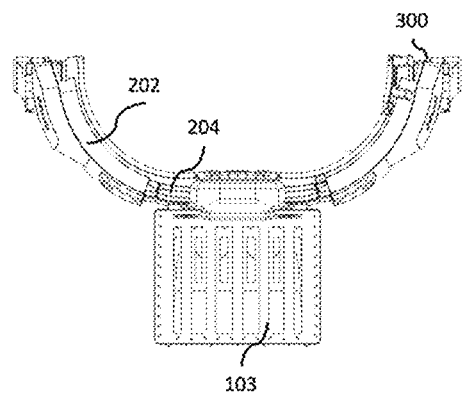
FIG. 17b is a schematic diagram (top view) showing the structure of an embodiment of a waist exoskeleton device of the present invention.
Figure 18A:
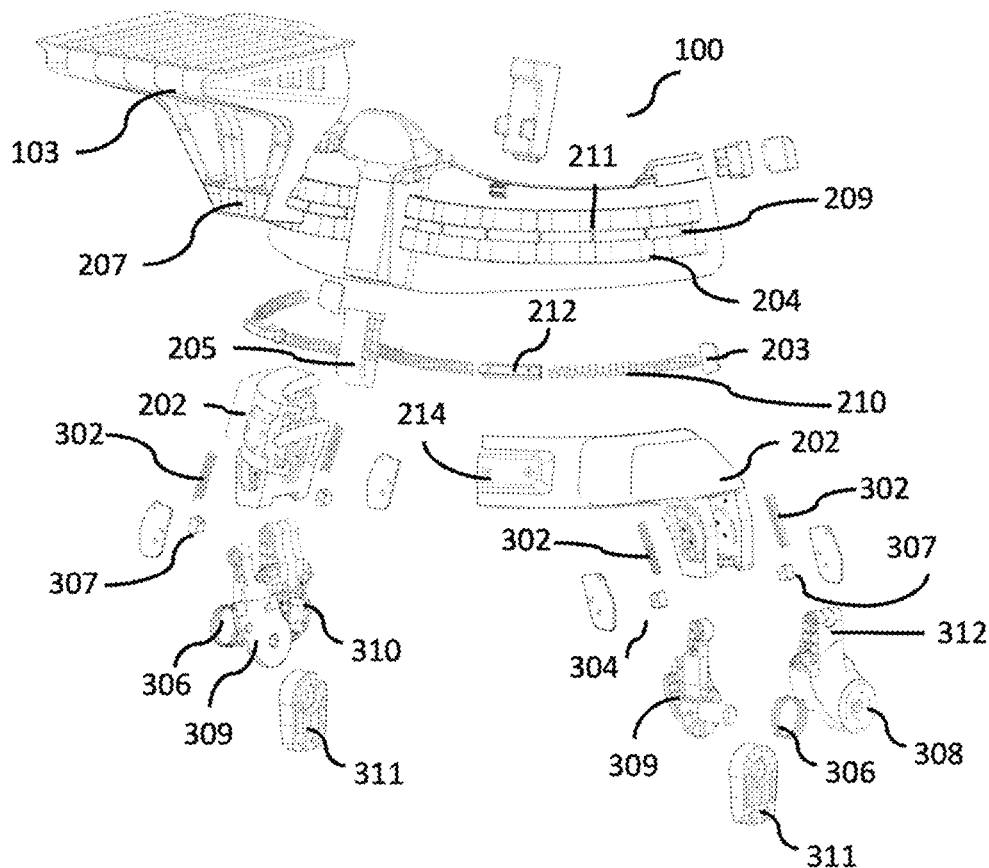
FIG. 18a is an exploded view of the structure and components of an embodiment of a waist exoskeleton device of the present invention.
Figure 18B:
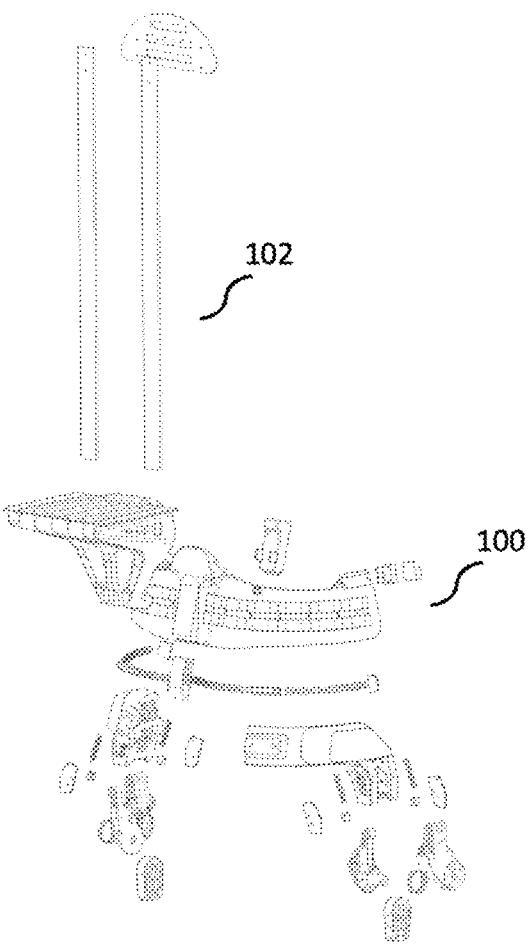
FIG. 18b is an exploded view of the structure and components of an embodiment of a waist exoskeleton device of the present invention.
Figure 19:
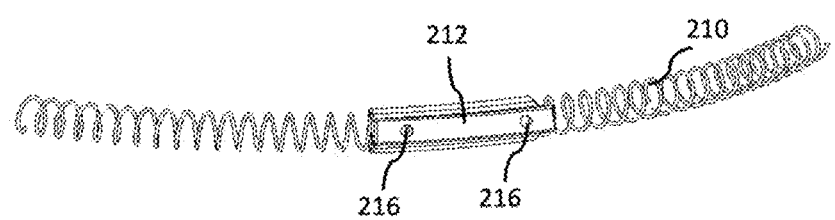
FIG. 19 is a schematic diagram showing the structure of a waist elastic mechanism in an embodiment of a waist exoskeleton device of the present invention.
Figure 20A:
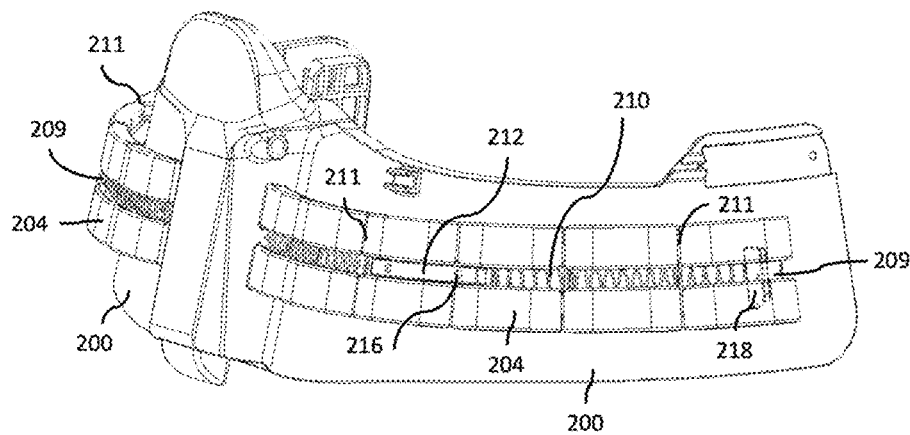
FIG. 20a is a schematic diagram showing the structure of a waist slide rail mechanism in an embodiment of a waist exoskeleton device of the present invention.
Figure 20B:
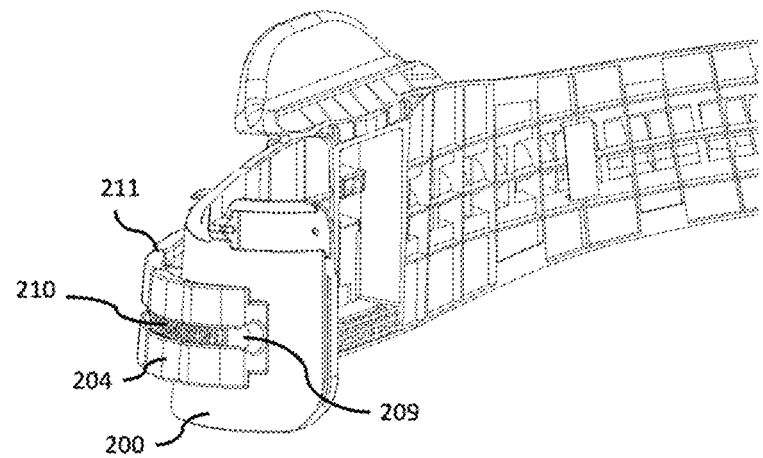
FIG. 20b is a schematic diagram showing the structure of a waist slide rail mechanism in an embodiment of a waist exoskeleton device of the present invention.
Figure 20C:
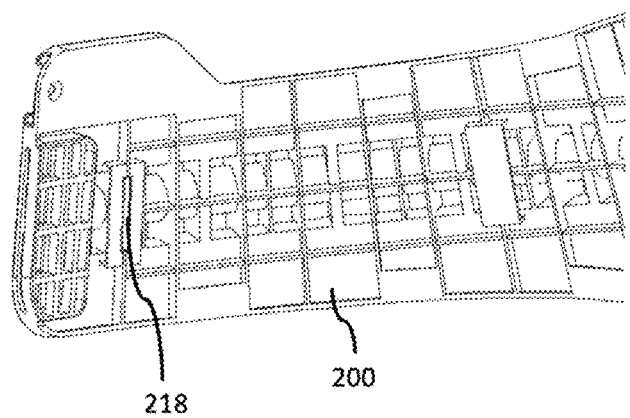
FIG. 20c is a schematic diagram showing the structure of a waist slide rail mechanism in an embodiment of a waist exoskeleton device of the present invention.

In some embodiments, with reference to FIGS. 14a and 14b, the waist exoskeleton device 100 of the present invention can be connected to a back supporting device 102 and a lower limb exoskeleton device 105 (for example, glass fiber sheet, sheet metal, metal rod). And the lower limb exoskeleton device 105 can also be connected to a foot exoskeleton device 110 via a thigh elastic energy storage device 104 (for example, torsion spring, tension spring, compression spring or pneumatic pusher), a knee joint exoskeleton device 106 (for example, eccentric wheel structure), and a shank exoskeleton supporting member 108.

In addition, the waist exoskeleton device 100 can be provided with a back-carrying platform 103 according to actual demands (for example, weight and shape of heavy objects to be carried on the back). The structure of the back-carrying platform can be designed and changed according to actual conditions. For example, as shown in FIG. 3, the contact part 207 of the back-carrying platform 103 and the waist slide rail 200 can be designed to be L-shaped, and the long side of the L-shaped structure is shorter than the waist slide rail 200. Therefore, when the back-carrying platform 103 is opened (i.e., in an open state, when the back-carrying platform 103 is capable of bearing heavy objects), a space 208 is formed between the contact part 207 of the long side of the L-shaped structure and the waist slide rail 200. A user forcibly pushes the back-carrying platform 103 so that the back-carrying platform can be firmly clamped on the waist exoskeleton device via a tenon mechanism. This can improve the stability and the firm degree of the back-carrying platform 103 which is being opened to bear heavy objects.

In some embodiments, the waist slide rail 200 is composed of a plurality of waist slide rail pieces 211 that the adjacent waist slide pieces are foldable against each other. The waist slide rail 200 is designed as a multi-segment structure in order to meet different demands of the human body when a person wears the waist exoskeleton device—for example, the bending degree and the radian of the waist slide rail 200 around the waist will naturally differ due to different waist circumferences, and the multi-segment structure is adopted to make the waist slide rail 200 easier to bend so as to better adapt to different waist circumferences.

In some embodiments, the waist elastic mechanism 210 is a torsion spring, a tension spring, a compression spring or a pneumatic pusher.

In some embodiments, the waist slide rail 200 comprises a left waist slide rail and a right waist slide rail; the waist pulley 202 comprises a left waist pulley and a right waist pulley; the waist elastic mechanism 210 comprises a left waist elastic mechanism and a right waist elastic mechanism; the left waist elastic mechanism 210 is placed on the left waist slide rail 200 and connected to the left waist pulley 202, and provides elastic energy storage during the sliding process of the left waist pulley 202 along the left waist slide rail 200; and the right waist elastic mechanism 210 is placed on the right waist slide rail 200 and connected to the right waist pulley 202, and provides elastic energy storage during the sliding process of the right waist pulley 202 along the right waist slide rail 200. In some embodiments, the left and right waist elastic mechanisms 210 are connected via a waist middle connecting block and can operate independently or integrally.

In some embodiments, the waist pulley 202 is connected to a hip joint rotary connecting part 300, and the hip joint rotary connecting part 300 comprises a hip joint sagittal axis mechanism 304 and a hip joint frontal axis mechanism 310.

In some embodiments, the waist pulley 202 is connected to the hip joint sagittal axis mechanism 304, and the hip joint sagittal axis mechanism 304 is connected to a lower limb exoskeleton device 105 and allows the lower limb exoskeleton device 105 to have a degree of freedom to turn towards the left and right sides of the human body (i.e., in the bb' direction (FIG. 21a), abduction and adduction of the hip joint/thigh of the human body).

In some embodiments, a lateral rotation elastic energy storage device 302 is arranged in the hip joint sagittal axis mechanism 304.

In some embodiments, the lateral rotation elastic energy storage device 302 is a torsion spring, a tension spring, a compression spring or a pneumatic pusher.

Figure 21C:
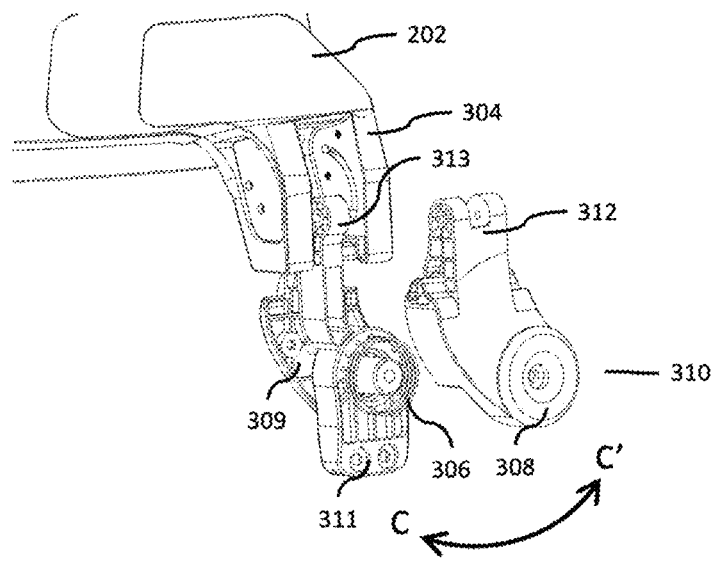
FIG. 21c is a schematic diagram showing the local structure of an embodiment of a waist exoskeleton device of the present invention.

In some embodiments, the waist pulley 202 is connected to a hip joint frontal axis mechanism 310, and the hip joint frontal axis mechanism 310 is connected to a lower limb exoskeleton device 105 and drives the lower limb exoskeleton device 105 to turn towards the front and back of the human body (i.e., in the cc' direction (FIG. 21c), flexion and extension of the hip joint/thigh of the human body).

In some embodiments, a forward and backward rotation elastic energy storage device 306 is arranged in the hip joint frontal axis mechanism 310.

In some embodiments, the forward and backward rotation elastic energy storage device 306 is a torsion spring, a tension spring, a compression spring or a pneumatic pusher.

In some embodiments, a right male part 308 and a right female part 309 of the hip joint frontal axis mechanism 310 are combined together, and a front and back rotating elastic energy storage device (torsion spring) 306 is placed therebetween. The torsion spring is placed in a lower limb connecting part 311. The right male part 308 is provided with a first connector 312, the right female part 309 is provided with a second connector 313, the first connector 312 and the second connector 313 can be combined together, and a lateral rotation shaft 307 is arranged therebetween. The lateral rotation elastic energy storage device 302 is connected to the lateral rotation shaft 307 so that the lateral rotation shaft 307 can move along a lateral rotation shaft rail 303 in body actions such as forward and backward leg lift and side leg lift. This makes the human body not only to have a degree of freedom to rotate around the lateral rotation shaft 307 left and right during leg lift but also to have a degree of freedom to move along the lateral rotation shaft rail 303 (i.e., in the dd' direction) as well as to be subjected to damping (produced by a tension spring 302) when moving in this degree of freedom. This ensures stability and controllability of movement while increasing degrees of freedom.

It should be noted that terms of "comprise", "include" or any other variant herein are intended to cover non-exclusive inclusion, so that a process, a method, an article or a device which includes a series of elements not only includes such elements, but also includes other elements not listed clearly or also includes inherent elements in the process, the method, the article or the device. Under the condition of no more limitation, the elements defined by a sentence "include one . . . " do not exclude additional identical elements in the process, the method, the article or the device which includes the elements.

The various embodiments aforementioned are merely illustrative of the technical solutions of the present invention, rather than its limitations; notwithstanding the detailed description of the present invention with reference to the aforementioned embodiments, those with ordinary skilled in the art shall understand that they can still modify the technical solutions described in the aforementioned embodiments, or substitute some or all of the technical features with their equivalents; these modifications or substitutions do not substantially depart from the spirit and scope of the technical solutions of the embodiments of the present invention, and they shall all fall within the scope of the claims and the specification of the present invention. For instance, the frontal axis mechanism 414 in embodiments 1, 2, and 3 can adopt the structure of the hip joint frontal axis mechanism 310 in embodiment 6. The movement rail (vertical axis mechanism) in embodiments 1 and 3 also can adopt the structure of the waist slide rail in embodiment 6.

The invention claimed is:

1. An exoskeleton, wherein comprising a hip mechanism which comprises a left hip and a right hip, the left hip and the right hip respectively comprise at least three single-axis mechanisms collaboratively realizing isomorphic motion of the hip mechanism and the hip of the human body, wherein the at least three single-axis mechanisms comprise a sagittal axis mechanism, a frontal axis mechanism, and a vertical axis mechanism; the sagittal axis mechanism rotates around a sagittal axis of the exoskeleton, and the sagittal axis of the exoskeleton is parallel to that of a thigh of the human body; the frontal axis mechanism rotates around a frontal axis of the exoskeleton, and the frontal axis of the exoskeleton is parallel to that of a thigh of the human body; and the vertical axis mechanism rotates around a vertical axis of the exoskeleton, and the vertical axis of the exoskeleton coincides with or is parallel to that of a thigh of the human body, wherein the hip mechanism also comprises a hip base; the sagittal axis mechanism comprises a sagittal axis mounting base; the frontal axis mechanism comprises a frontal axis mounting base; and the vertical axis mechanism comprises at least one movement rail;

wherein, the frontal axis mounting base is arranged on the at least one movement rail and can move on the at least one movement rail along the length direction of the at least one movement rail; and one side of each sagittal axis mounting base is arranged in the hip base, and the other side is connected to the at least one movement rail;

wherein the at least one movement rail comprises a slide rail mechanism and a pulley mechanism which are slidably connected; and wherein one end of the slide rail mechanism is connected to the sagittal axis mounting base, the frontal axis mounting base is fixed on the pulley mechanism, and the pulley mechanism can slide on the slide rail mechanism along the length direction of the slide rail mechanism so that the frontal axis mounting base is driven by the pulley mechanism to rotate around the vertical axis mechanism around the vertical axis of the exoskeleton on the slide rail mechanism.

2. The exoskeleton according to claim 1, wherein the sagittal axis mechanism and the vertical axis mechanism are directly connected, optionally by means of quick release; and collaboratively move.

3. The exoskeleton according to claim 1, wherein the frontal axis mechanism is directly connected to and is operable to collaboratively move with the sagittal axis mechanism or the vertical axis mechanism.

4. The exoskeleton according to claim 3, wherein the frontal axis mechanism is directly connected to the sagittal axis mechanism or the vertical axis mechanism by means of quick release.

5. The exoskeleton according to claim 1, wherein a damping mechanism and/or a rebound mechanism are/is respectively arranged in the at least three single-axis mechanisms.

6. The exoskeleton according to claim 5, wherein the damping mechanism comprises a damping force adjusting mechanism; and the rebound mechanism comprises a rebound force adjusting mechanism.

7. The exoskeleton according to claim 1, wherein a hip base adjusting device is arranged in the hip base to adjust the length of the hip base.

8. The exoskeleton according to claim 1, wherein the sagittal axis mounting base and the slide rail mechanism are connected by means of quick release.

9. The exoskeleton according to claim 1, wherein a damping mechanism and/or a rebound mechanism are/is arranged in the sagittal axis mounting base.

10. The exoskeleton according to claim 1, wherein a rotary damping mechanism and/or a two-way rebound mechanism are/is arranged in the pulley mechanism and/or the frontal axis mounting base.

11. The exoskeleton according to claim 1, wherein the movement rail comprises a telescopic rod mechanism, one end of the telescopic rod mechanism is installed on the sagittal axis mounting base, and the other end is fixedly connected to the frontal axis mounting base; and the telescopic rod drives the frontal axis mounting base to rotate around the vertical axis of the exoskeleton during contraction or extension.

12. The exoskeleton according to claim 11, wherein the telescopic rod mechanism comprises an inner rail, an inner ball retainer, a middle rail, an outer ball retainer, an outer rail, and a flexible porous cover which are sleeved in sequence, wherein the inner ball retainer is uniformly provided with a plurality of inner steel balls so that the inner steel balls can slide along the inner rail, and the middle rail can slide along the inner ball retainer; and the outer ball retainer is uniformly provided with a plurality of outer steel balls so that the outer steel balls can slide along the middle rail, and the outer rail can slide along the outer ball retainer.

13. The exoskeleton according to claim 1, wherein the hip mechanism comprises a hip base, the left hip and the right hip of the hip mechanism are respectively hinged on the left and right sides of the hip base, and the left hip and the right hip can rotate in a horizontal plane; the vertical axis mechanism comprises a movement rail composed of a plurality of slide rails connected end to end in sequence, and a variable-curvature pulley mechanism; the head end of the plurality of slide rails is rotatably connected to the hip base, and the tail end is connected to the plurality of slide rails on the other side; and the variable-curvature pulley mechanism is installed on the plurality of slide rails and slides on the movement rail; one end of the sagittal axis mechanism is installed on the variable-curvature pulley mechanism, and the other end is connected to the frontal axis mounting base of the frontal axis mechanism; the sagittal axis mechanism takes the form of a guide rod position-changing mechanism to rotate around the sagittal axis of the exoskeleton.

14. The exoskeleton according to claim 13, wherein the variable-curvature pulley mechanism comprises a variable-curvature main pulley and variable-curvature side pulleys respectively hinged on both sides of the variable-curvature main pulley, and the variable-curvature main pulley and the variable-curvature side pulleys are installed on the movement rail in the form of being capable of sliding relative to the plurality of slide rails.

15. The exoskeleton according to claim 14, wherein a stopper or a limiting groove for limiting the rotation angle of the variable-curvature side pulley relative to the variable-curvature main pulley is arranged at the hinge point of the variable-curvature main pulley and the variable-curvature side pulley.

16. The exoskeleton according to claim 13, wherein the guide rod position-changing mechanism comprises a guide rod, a rocker, a piston cylinder, and a base fixed on the variable-curvature main pulley, wherein one end of the guide rod is hinged with the middle part of the base, and the other end is fixedly connected to a piston head in the piston cylinder; one end of the rocker is hinged with the bottom of the base, and the other end is hinged with the cylinder head of the piston cylinder; and the bottom of the piston cylinder is fixedly connected to the frontal axis mounting base.

17. The exoskeleton according to claim 13, wherein the hip mechanism also comprises a flexible waist belt, and the plurality of slide rails are fitted on the outer side of the flexible waist belt along the length direction of the flexible waist belt.

18. The exoskeleton according to claim 1, wherein the hip mechanism also comprises a hip width adjusting member arranged on the hip base, and the hip width adjusting member is located between the left hip and the right hip and drives the left hip and the right hip to horizontally move towards or away from on the hip base.

* * * * *